(12) United States Patent
Hussey et al.

(10) Patent No.: US 12,427,750 B2
(45) Date of Patent: *Sep. 30, 2025

(54) SUBSTRATE WITH DEPOSITION AND/OR FRICTION REDUCTION COATING

(71) Applicant: XEFCO PTY LTD, Lilyfield (AU)

(72) Inventors: Thomas Hussey, Drummoyne (AU); Scott Whitby, Chatswood (AU)

(73) Assignee: XEFCO PTY LTD, Lilyfield (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/807,084

(22) Filed: Aug. 16, 2024

(65) Prior Publication Data

US 2024/0408844 A1    Dec. 12, 2024

Related U.S. Application Data

(63) Continuation of application No. 17/623,434, filed as application No. PCT/AU2020/050667 on Jun. 26, 2020, now Pat. No. 12,076,959.

(30) Foreign Application Priority Data

Jun. 28, 2019  (AU) ................................ 2019902309
Jul. 25, 2019  (AU) ................................ 2019902645
Jan. 31, 2020  (AU) ................................ 2020900261

(51) Int. Cl.
B32B 3/26    (2006.01)
B32B 3/20    (2006.01)
(Continued)

(52) U.S. Cl.
CPC .................. *B32B 7/05* (2019.01); *B32B 3/20* (2013.01); *B32B 3/26* (2013.01); *B32B 3/263* (2013.01); *B32B 3/30* (2013.01); *B32B 5/022* (2013.01); *B32B 5/266* (2021.05); *B32B 9/007* (2013.01); *B32B 9/047* (2013.01); *B32B 15/14* (2013.01);
(Continued)

(58) Field of Classification Search
CPC .. B32B 3/26; B32B 3/263; B32B 3/30; B32B 5/266
See application file for complete search history.

(56) References Cited

U.S. PATENT DOCUMENTS 4,637,947 A       1/1987  Maekawa et al.
12,076,959 B2 *   9/2024  Hussey ................... B32B 9/047
(Continued)

FOREIGN PATENT DOCUMENTS

GB      2388815      11/2003
WO      2001/58683    8/2001

OTHER PUBLICATIONS

International Search Report for PCT/AU2020/050667, mailed Aug. 24, 2020, 4 pages.
(Continued)

*Primary Examiner* — Elizabeth E Mulvaney
(74) *Attorney, Agent, or Firm* — Nixon & Vanderhye P.C.

(57) ABSTRACT

A substrate includes a bonding array with a plurality of bonding locations. A low emissivity layer is deposited on at least one side of the substrate and covers at least some of the bonding locations. The low emissivity layer may be a metal layer which functions as a radiant barrier. The fibers include a melted exterior due to bonding of the fibres at the bonding locations melting the exterior of the fibres.

20 Claims, 11 Drawing Sheets

(51) Int. Cl.
  *B32B 3/30* (2006.01)
  *B32B 5/02* (2006.01)
  *B32B 5/26* (2006.01)
  *B32B 7/05* (2019.01)
  *B32B 9/00* (2006.01)
  *B32B 9/04* (2006.01)
  *B32B 15/14* (2006.01)
  *B32B 15/20* (2006.01)

(52) U.S. Cl.
  CPC .......... *B32B 15/20* (2013.01); *B32B 2255/02* (2013.01); *B32B 2262/0215* (2013.01); *B32B 2307/304* (2013.01); *B32B 2307/3065* (2013.01); *B32B 2307/40* (2013.01); *B32B 2307/728* (2013.01); *B32B 2307/73* (2013.01); *B32B 2307/754* (2013.01); *B32B 2437/00* (2013.01)

(56) References Cited

U.S. PATENT DOCUMENTS

| | | |
|---|---|---|
| 2003/0027476 A1 | 2/2003 | Vogt |
| 2013/0319214 A1 | 12/2013 | Kopan |
| 2016/0129663 A1 | 5/2016 | Moss |
| 2018/0272673 A1 | 9/2018 | Miller et al. |
| 2022/0347968 A1 | 11/2022 | Hussey et al. |

OTHER PUBLICATIONS

Written Opinion of the ISA for PCT/AU2020/050667, mailed Aug. 24, 2020, 6 pages.

Hussey et al., U.S. Appl. No. 17/623,434, filed Dec. 28, 2021, for "Substrate With Deposition and/or Friction Reduction Coating," (parent application).

\* cited by examiner

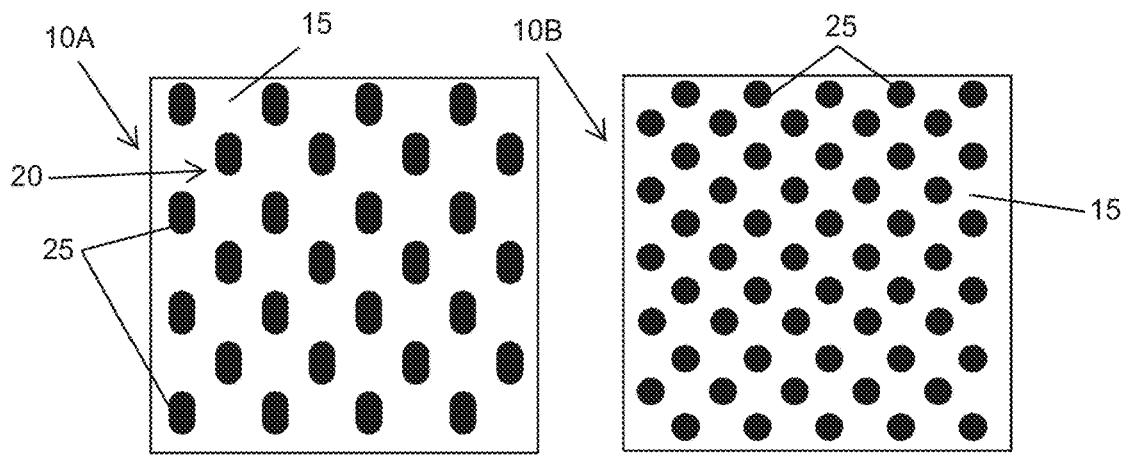
FIGURE 1A
FIGURE 1B
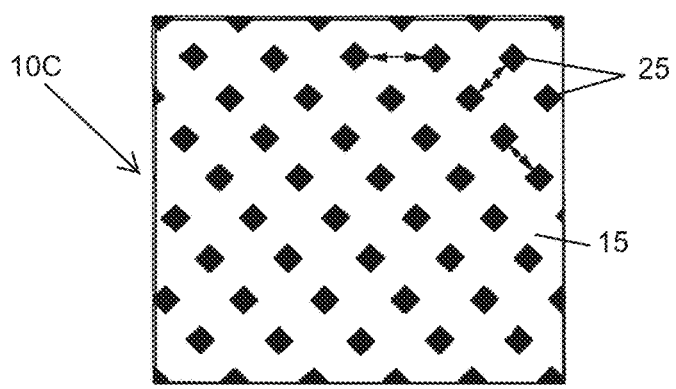
FIGURE 1C
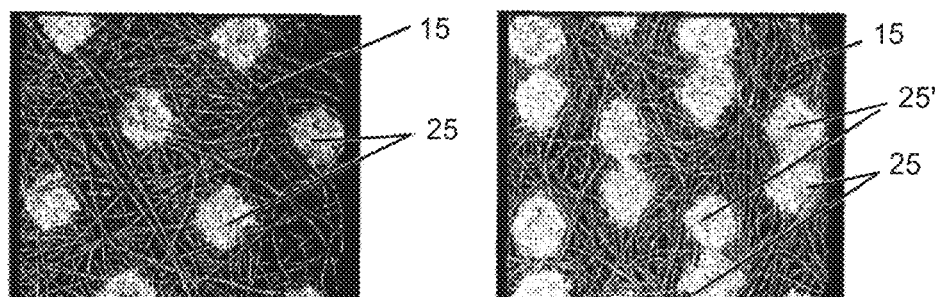
FIGURE 2A
FIGURE 2B
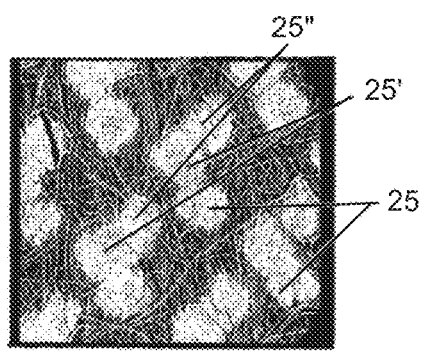
FIGURE 2C

SUBSTRATE WITH DEPOSITION AND/OR FRICTION REDUCTION COATING

CROSS REFERENCE TO RELATED APPLICATIONS

This application is a continuation of U.S. application Ser. No. 17/623,434, filed Dec. 28, 2021, which is the U.S. national phase of International Application No. PCT/AU2020/050667 filed 26 Jun. 2020, which designated the U.S. and claims priority to AU patent application No. 2019902309 filed 28 Jun. 2019, AU patent application No. 2019902645 filed 25 Jul. 2019, and AU patent application No. 2020900261 filed 31 Jan. 2020, the entire contents of each of which are hereby incorporated by reference in their entirety.

TECHNICAL FIELD

The present disclosure relates to fabrics with a deposited material. More particularly, the present disclosure relates to nonwoven substrates with a radiant barrier deposition thereon and/or substrates with fibres having reduced friction.

BACKGROUND

Nonwoven materials are common used in disposable items and disposable garments. There are a number of methods of manufacture for these materials which can result in substantially different uses. Primarily, these materials are formed from synthetic materials such as polymeric thermoplastics which are formed from a spun-bonded, drylaid or wetlaid process. Such thermoplastics may include HDPE, PP, LDPE and PET.

Nonwoven materials may be desirable for their strength to weight ratio and also for their softness and flexibility. As such, these materials are generally desirable for the above applications. These materials also have a generally desirable abrasion resistance when used for products designed to be worn. While the structure of the nonwoven may provide some properties, the bonding pattern or bonding array applied to a nonwoven fabric can impart further functional properties to the nonwoven or alter the existing properties of the nonwoven material. Thermal bonding may be used to provide a bonding pattern or bonding array to the nonwoven material, and modify properties such as; rigidity, flexibility, abrasion resistance, texture, tensile strength, stretchability, drapeability and gripability.

It is also common for nonwovens to have one or more post-processing steps to apply a treatment, coating, or layer to the nonwoven for its intended final application. For example, wet wipes may be applied with a germicide or other cleaning chemical after fabrication.

In addition to thermal bonding, embossing of nonwovens may be desirable. To emboss fabrics and films by passing them between a metal roll patterned in raised and depressed areas, and a solid backup roll. Embossing may cause larger surface variations on the substrate and are generally for ornamental purposes, rather than functional purposes.

There are varying applications for nonwoven materials, which include their use as filters, geotextiles, feminine hygiene products, packing materials, acoustic insulation and batting, to name a few applications. One primary use of nonwoven materials is for their use in thermal insulation.

A number of industries utilise nonwoven materials, such as the building industry, automotive industry, furniture industry and garment manufacture industry. These insulation materials may be formed and tailored for their final purpose depending on a large number of requirements, however, one primary concern is to provide an insulation material which is lightweight and can function with to retain thermal energy within a space, or prevent or reduce thermal energy from leaving a space.

As such, it may be desirable to provide for a nonwoven material which has improved thermal insulation properties while also reducing the overall weight or thickness of the nonwoven.

Any discussion of the prior art throughout the specification should in no way be considered as an admission that such prior art is widely known or forms part of common general knowledge in the field.

SUMMARY

Problems to be Solved

It may be advantageous to provide for a nonwoven material with a radiant barrier.

It may be advantageous to provide for a substrate with a nonwoven structure with at least one reflective layer thereon.

It may be advantageous to provide for a nonwoven substrate with superior thermal insulative properties.

It may be advantageous to provide for a substrate with superior thermal retention properties.

It may be advantageous to provide for composite material formed from a nonwoven structure with a metal deposit formed thereon.

It may be advantageous to provide for a nonwoven structure with bonding locations forming superior thermal retention.

It may be advantageous to provide a fibrous substrate with a metallic layer applied thereto.

It may be advantageous to provide a nonwoven fabric with improved thermal insulative properties which is thinner than conventional nonwovens.

It is an object of the present invention to overcome or ameliorate at least one of the disadvantages of the prior art, or to provide a useful alternative.

Means for Solving the Problem

In a first aspect there may be provided a substrate with an array disposed thereon. The substrate may comprise a bonding array comprising a plurality of bonding locations; and wherein a low emissivity layer may be deposited on at least one side of the substrate.

Preferably, the plurality of bonding locations may be disposed in a regular array. Preferably, the low emissivity material may be a radiant barrier. Preferably, the low emissivity material may be selected from the following group; aluminium, copper, gold, silver, carbon (such as diamond-like carbons or tetrahedral amorphous carbons), cadmium, zinc, indium, tin, titanium, bismuth, zirconium, zirconia, any combination of materials aforementioned and any of their alloys and/or oxides. Preferably, the bonding locations may comprise a primary region of compaction and a secondary region of compaction. Preferably, the shape of the bonding locations of the bonding array may comprise at least one shape selected from the group of; diamond, square, triangle, circle and any other predetermined regular shape. Preferably, a friction reduction coating may be applied to the substrate, such that the frictional coefficient between adjacent fibres of the substrate is in the range of 0.01 to 0.5. Preferably, an insulation layer may be disposed adjacent to the low emissivity layer. Preferably, the density of the fibres of the insulation layer adjacent to the low emissivity layer may be selected such that the ratio of the volume of fibre in the insulation to the volume of air in the insulation is between 1:30 and 1:1000. Preferably, the bonding locations may cover more than 40% of the surface of the substrate. Preferably, the substrate may be formed with at least one thermoplastic elastomeric selected from the following group; Styrenic block copolymers, TPS (TPE-s), thermoplastic polyolefinelastomers, TPO (TPE-o), thermoplastic vulcanizates, TPV (TPE-v or TPV), thermoplastic polyurethanes, TPU (TPU) thermoplastic copolyester, TPC (TPE-E), thermoplastic polyamides, TPA (TPE-A), and not classified thermoplastic elastomers, TPZ. Preferably, the substrate may comprise at least one functionalisation which provides for at least one of the following properties; flame retardancy, UV absorbance, self-cleaning, hydrophobicity, hydrophilicity, and antibacterial properties. Preferably, the bonding array may be formed by two or more bonding processes, with each process forming a portion of the bonding array. Preferably, a second bonding process may impart a bonding location which joins to at least one respective bonding location from a first bonding process to form joined bonding locations.

In yet another aspect, there may be provided a substrate with a bonding array pattern. The substrate may comprise a first layer of fabric web and a second layer of fabric web bonded to the first layer of fabric web. The first and second layers of fabric web may be bonded together at a plurality of bonding locations; and wherein a low emissivity material may be disposed on at least one side of the substrate, in which the bonding locations may provide for a region of compressed fibres which has a larger surface area relative to the unbonded locations of the substrate.

Preferably, a third layer of fabric web may be bonded to the second layer of fabric web. Preferably, the first layer of fabric web and the second layer of fabric web may be formed by different processes selected from the following group; a meltblown process, a spunbond process, a spunlace process, dry laid process, and a bonded carded web process. Preferably, each of the bonding locations are formed with a primary region and a secondary region, in which the primary region may be formed with a generally uniform thickness and the secondary region may be formed with a thickness ranging from the thickness of the substrate to the thickness of the primary region. Preferably, the bonding array pattern may be defined by the primary regions of the bonding locations. Preferably, the bonding locations may cover more than 20% of the surface of the substrate.

In the context of the present invention, the words "comprise", "comprising" and the like are to be construed in their inclusive, as opposed to their exclusive, sense, that is in the sense of "including, but not limited to".

The invention is to be interpreted with reference to the at least one of the technical problems described or affiliated with the background art. The present aims to solve or ameliorate at least one of the technical problems and this may result in one or more advantageous effects as defined by this specification and described in detail with reference to the preferred embodiments of the present invention.

BRIEF DESCRIPTION OF THE FIGURES

FIG. 1A illustrates a top view of an embodiment of a bonding array on a substrate;

FIG. 1B illustrates a top view of another embodiment of a bonding array on a substrate;

FIG. 1C illustrates a top view of a further embodiment of a bonding array on a substrate;

FIG. 2A illustrates a top view of an embodiment of a substrate with a first bonding array imparted thereto;

FIG. 2B illustrates a top view of an embodiment of a substrate with a first and second bonding array imparted thereto;

Figure 3A:
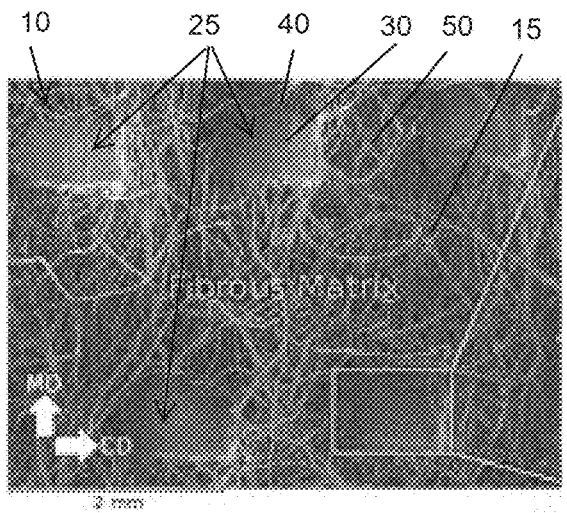
Figure 3B:
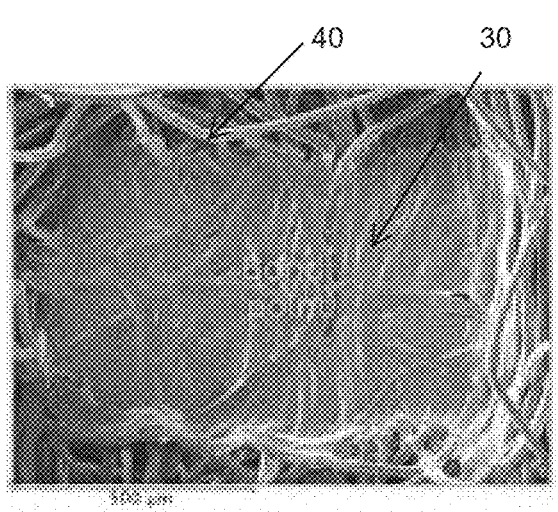
Figure 4A:
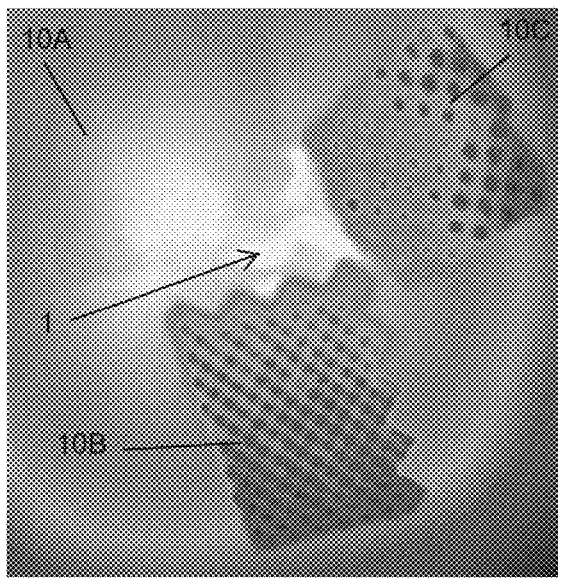
Figure 4B:
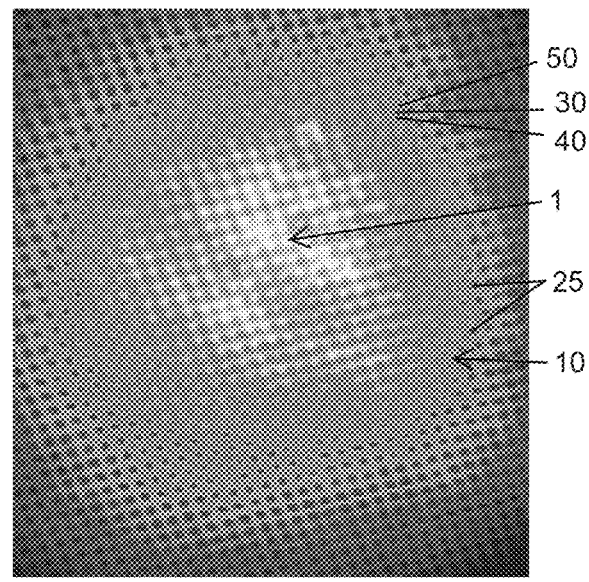
Figure 5A:
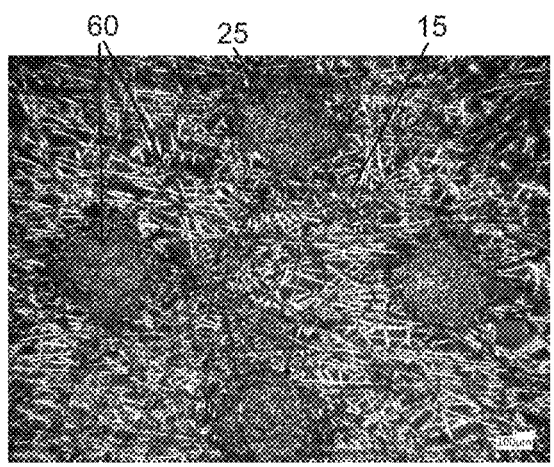
Figure 5B:
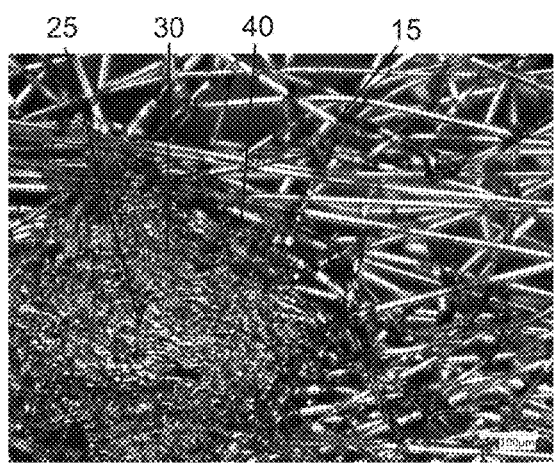
Figure 6A:
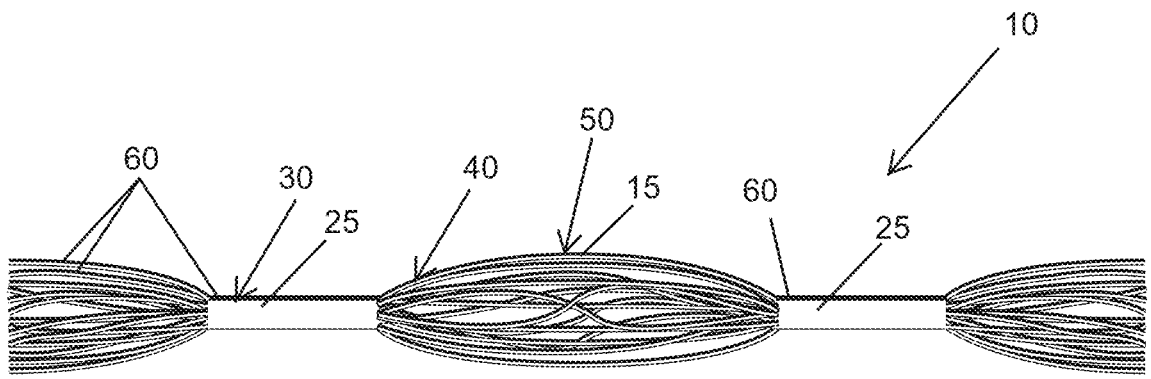
Figure 6B:
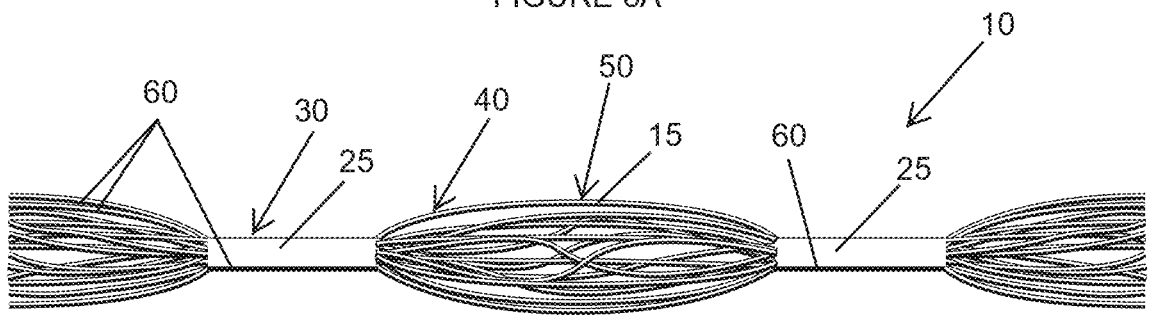
Figure 6C:
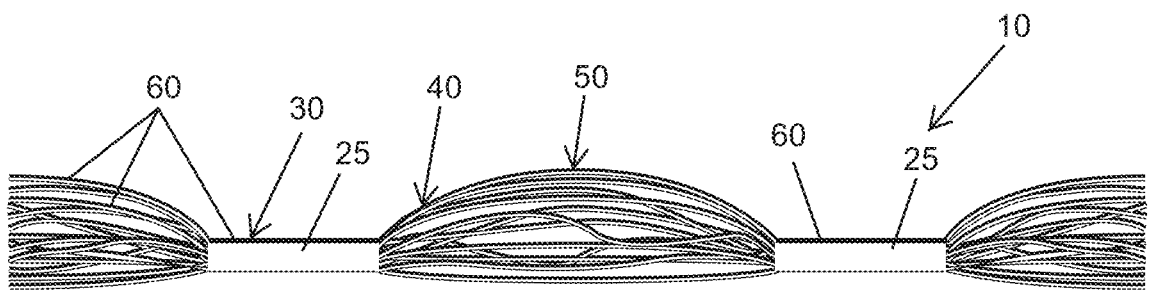
Figure 6D:
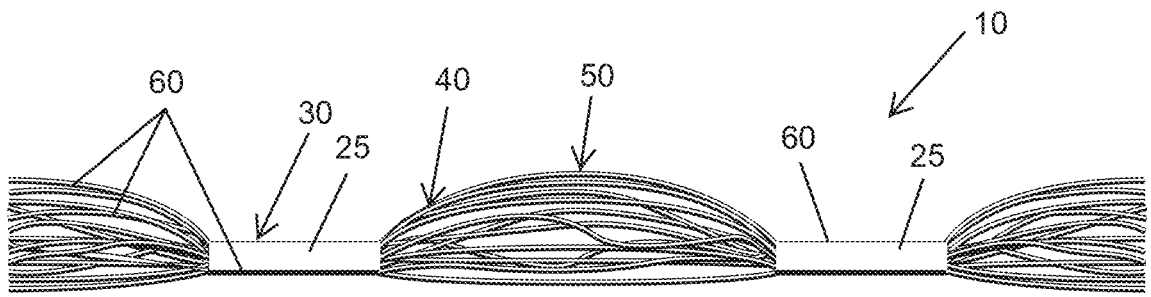
Figure 7A:
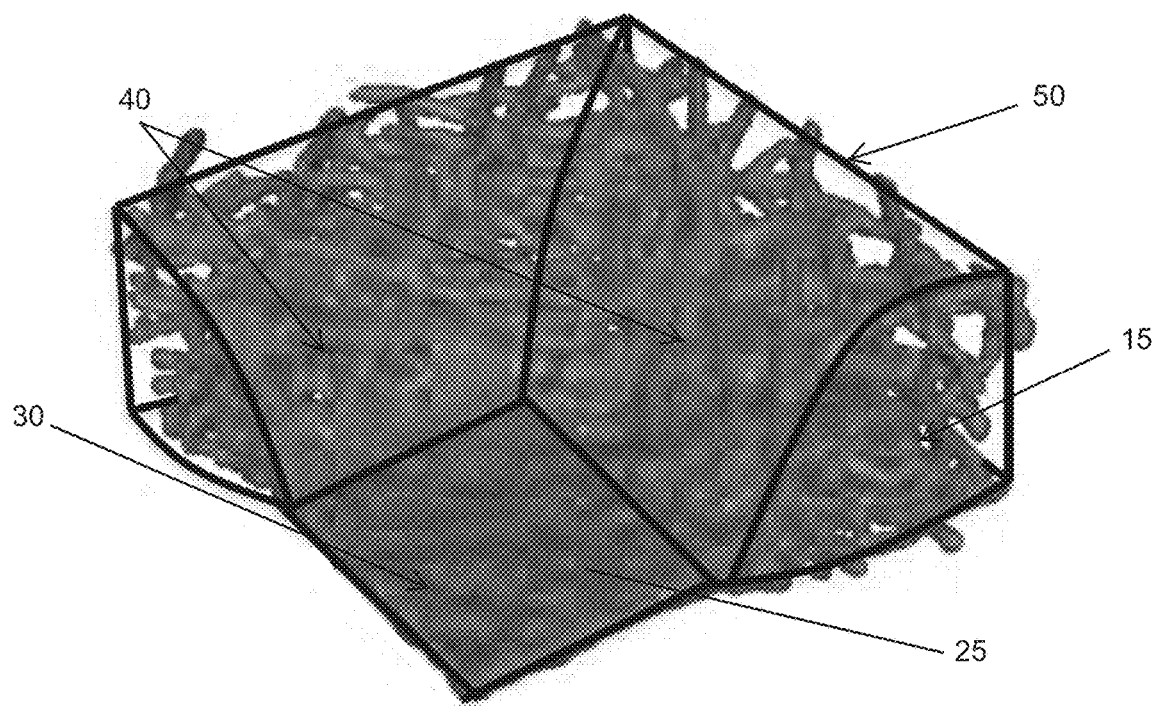
Figure 7B:
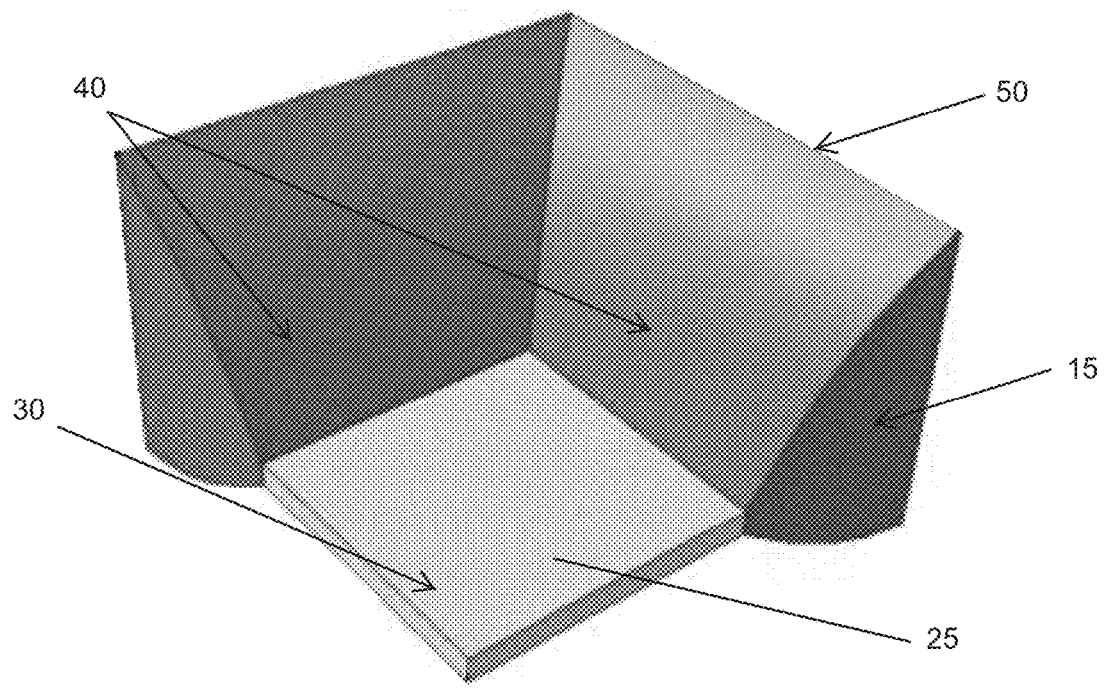
Figure 8:
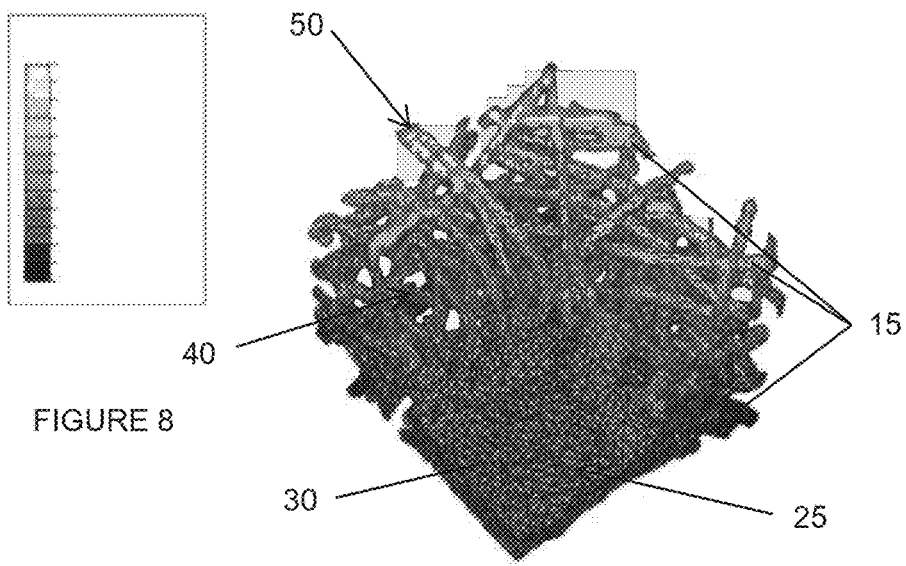
Figure 9:
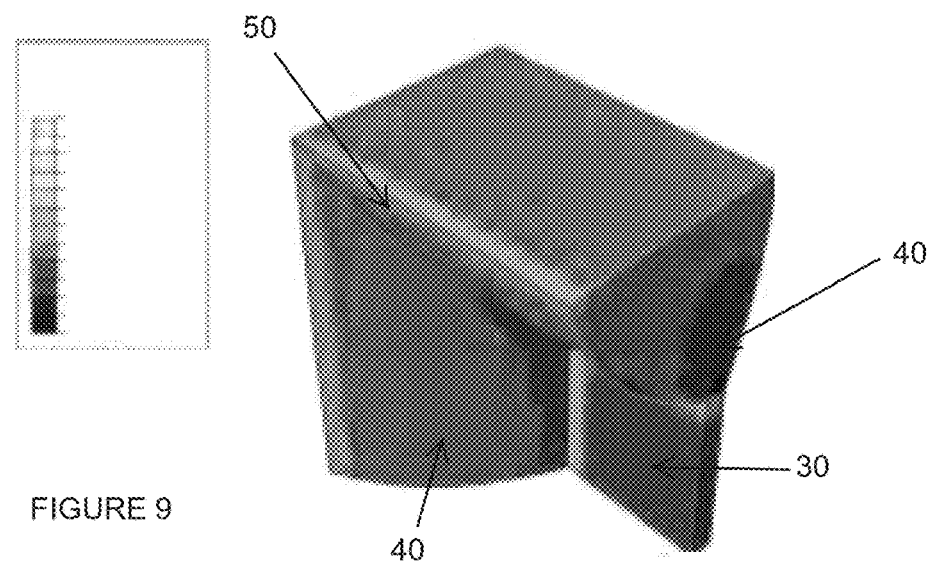
Figure 10:
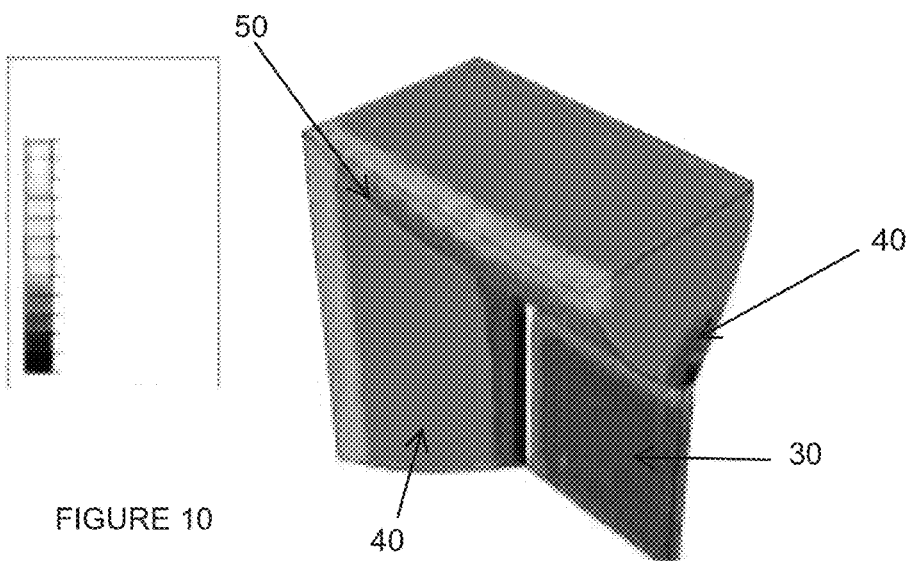
Figure 11:
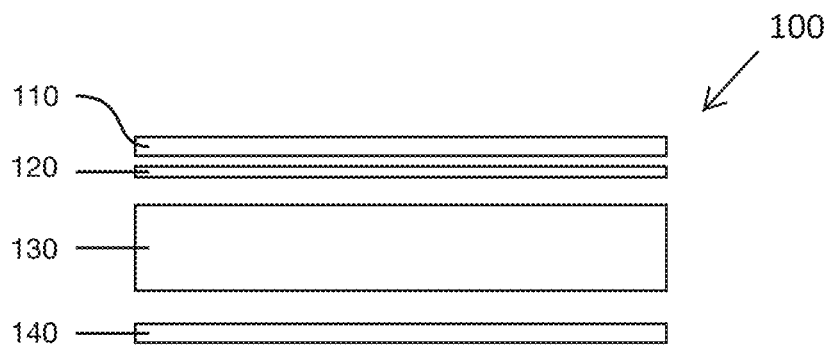
Figure 12:
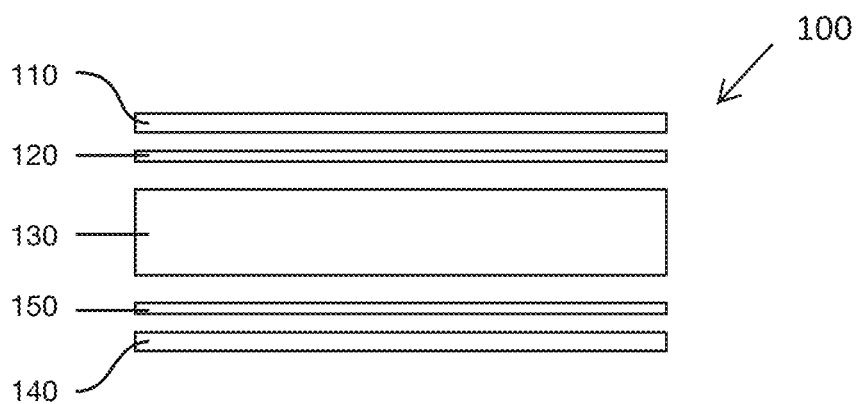
Figure 13A:
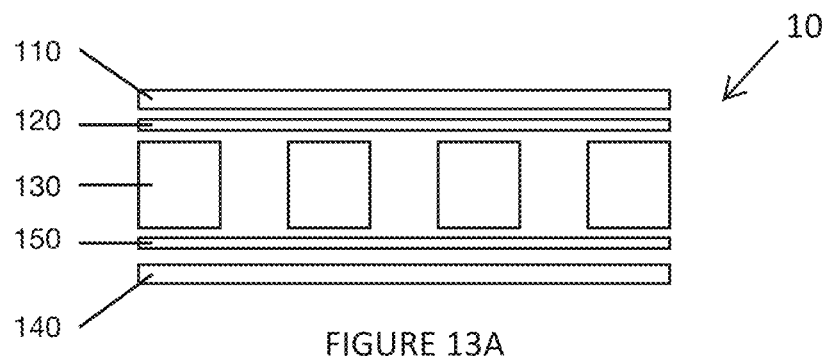
Figure 13B:
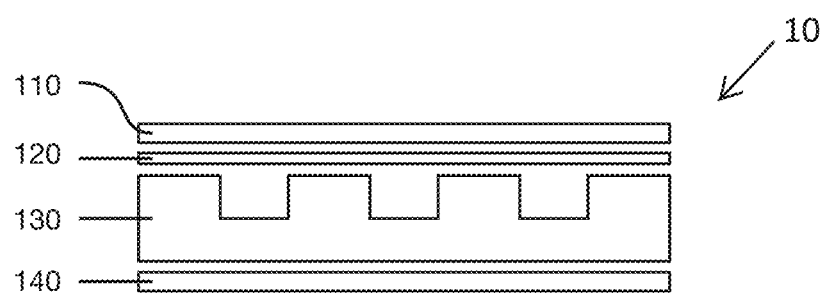
Figure 13C:
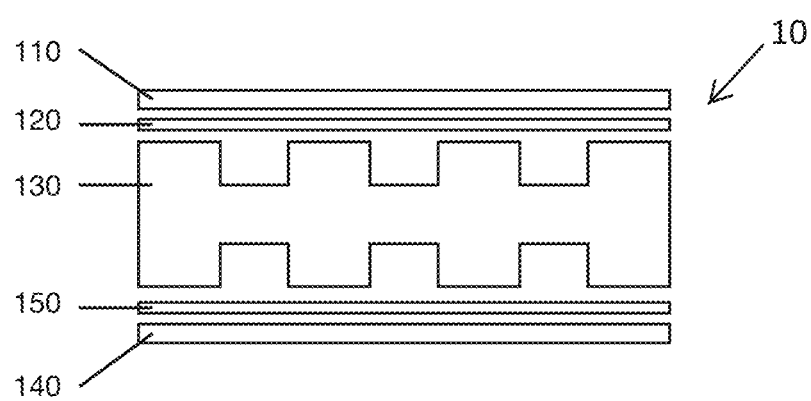
Figure 13D:
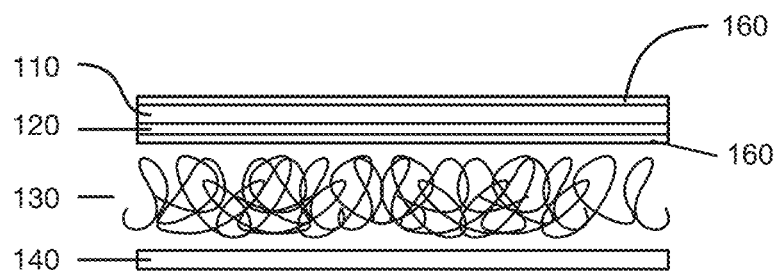
Figure 13E:
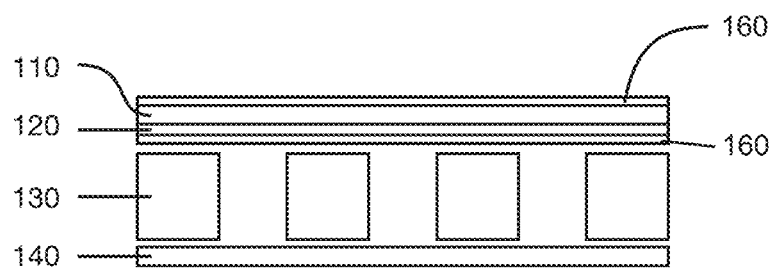
Figure 13F:
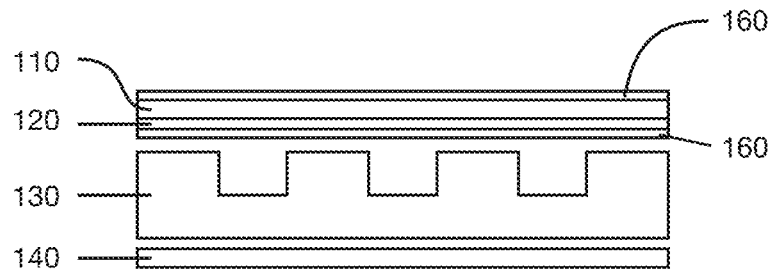
Figure 14A:
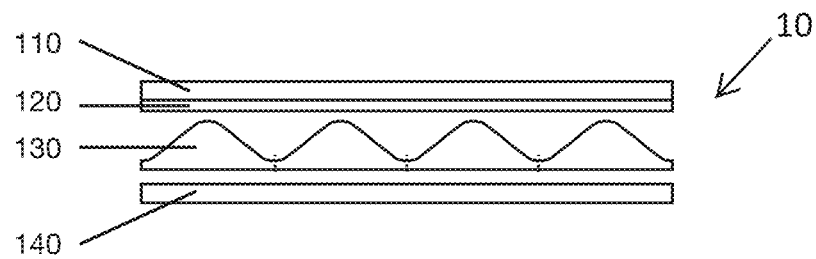
Figure 14B:
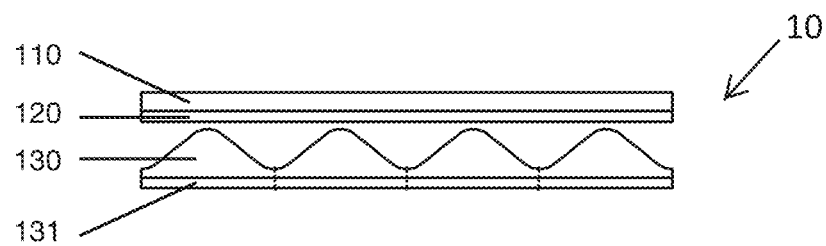
Figure 14C:
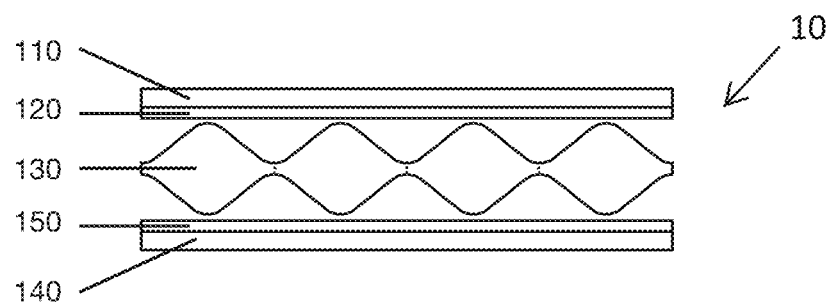
Figure 15A:
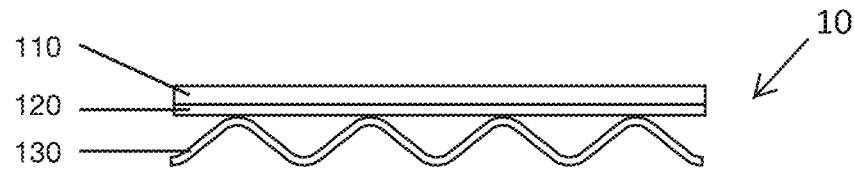
Figure 15B:
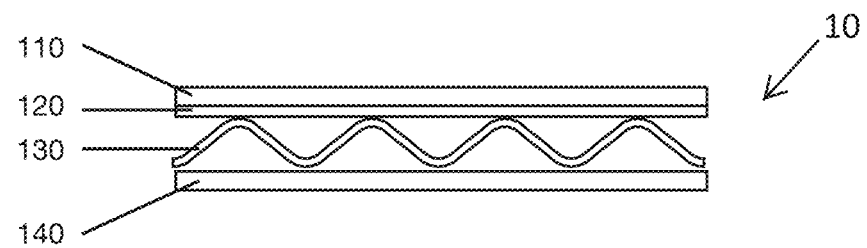
Figure 15C:
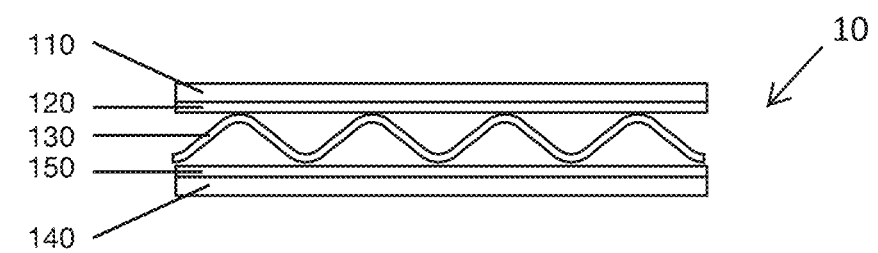
Figure 15D:
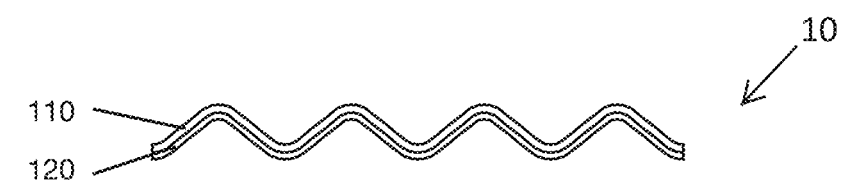
Figure 16A:
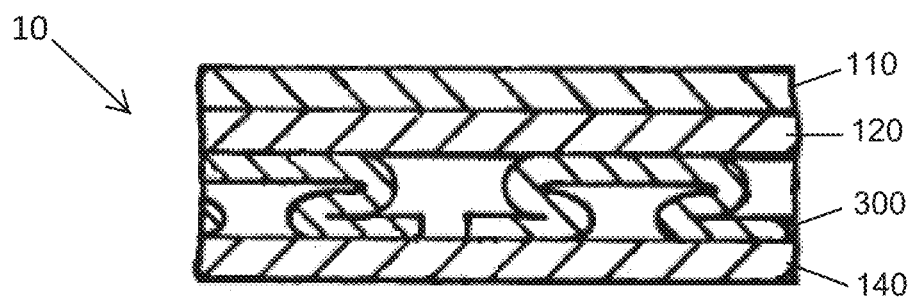
Figure 16B:
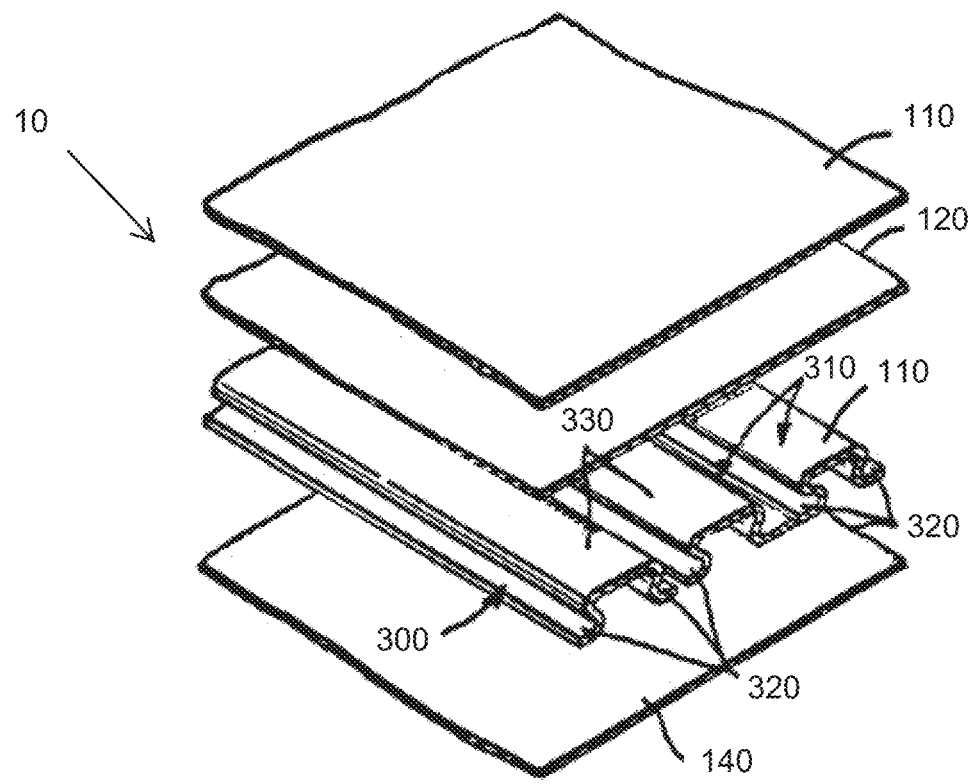

2C illustrates a top view of an embodiment of a substrate with a first, second and third bonding array imparted thereto;

FIG. 3A illustrates a top view an image of a section of a substrate with bonding locations thereon;

FIG. 3B illustrates a close-up view of a bonding location on the substrate of FIG. 3A;

FIG. 4A illustrates three different samples of substrates on a heating plate;

FIG. 4B illustrates a further embodiment of a substrate on a heating plate with a radiant barrier coated thereon;

FIG. 5A depicts an image of a sample substrate with a radiant barrier deposited thereon;

FIG. 5B depicts a close-up image of a sample substrate with a radiant barrier deposited thereon;

FIG. 6A illustrates a sectional view of an embodiment of a nonwoven substrate with a radiant barrier deposited thereon;

FIG. 6B illustrates another sectional view of an embodiment of a nonwoven substrate with a radiant barrier deposited thereon;

FIG. 6C illustrates a further sectional view of an embodiment of a nonwoven substrate with a radiant barrier deposited thereon;

FIG. 6D illustrates yet another sectional view of an embodiment of a nonwoven substrate with a radiant barrier deposited thereon;

FIG. 7A illustrates a 3-dimensional model of a sectional view of a bonding location and deformation of the fibres adjacent thereto;

FIG. 7B illustrates a solid 3-dimensional model of FIG. 7A;

FIG. 8 illustrates a 3-dimensional render of a bonding location and surrounding fibres;

FIG. 9 illustrates a sectional 3-dimensional model of a bonding location on a substrate with varying densities;

FIG. 10 illustrates another sectional 3-dimensional model of a bonding location on a substrate with varying densities; and FIG. 11 illustrates schematic diagrams of an embodiment of a composite material including layering combinations of substrates, metal layers and insulating layers;

FIG. 12 illustrates another schematic diagrams of an embodiment of a composite material including layering combinations of substrates, metal layers and insulating layers;

FIG. 13A shows an embodiment of a barrier with a perforated insulation layer;

FIGS. 13B and 13C illustrate embodiments of a barrier with an insulation layer with cavities;

FIG. 13D to 13F illustrate embodiments of a barrier with a non-woven insulation layer and the metal layer comprises a protective layer;

FIG. 14A to 14C illustrate embodiments of a barrier with an insulation layer with cavities;

FIG. 15A to 15D illustrate embodiments of a barrier with an insulation layer that is formed by embossing; and FIGS. 16A and 16B illustrate an embodiment of a textile with a spacer material used as the insulation layer.

DESCRIPTION OF THE INVENTION

Preferred embodiments of the invention will now be described with reference to the accompanying drawings and non-limiting examples.

As used herein the term "nonwoven substrate or web" means a web having a structure of individual fibres or threads which are interlaid, but not in an identifiable manner such as a weave or braid in a conventional fabric textile. However, the length of the filaments of the nonwoven may impart some direction to the fibres of the substrate when forming the web. Nonwoven fabrics or webs have been formed from many processes such as for example, meltblowing processes, spunbonding processes, spunlace processes, dry laid, and bonded carded web processes. The nonwoven substrate may have a weight of grams per square meter (gsm), generally in the range of between 5 gsm to 100 gsm, but more preferably around 10 gsm in the illustrated embodiments, and the fibre diameters useful are expressed in microns herein. The nonwoven substrate of the present invention may be referred to as a 'nonwoven fabric' or a 'scrim'.

Nonwoven substrates 10 may be formed from one or more layers of nonwoven fabrics or webs. For example, a nonwoven substrate 10 may comprise two spunbond layers and a meltblown layer therebetween. In this example, the spunbond layers may be used to improve the tearing strength of the nonwoven substrate and the meltblown layer may be used to increase the density of the fibres. Layering multiple substrates may assist with forming a nonwoven substrate with utility for filtration or for improving the durability of the nonwoven substrate 10. Each layer used to form the nonwoven substrate may impart a desired mechanical property to the substrate. each layer of the nonwoven substrate may be bonded, glued, fixed, adhered, or otherwise permanently connected with at least one other layer of the nonwoven substrate. for example, each of the spunbond layers in the example are bonded with the meltblown layer. Each of the layers may be formed independently and bonded together with an adhesive, or the layers may be formed from separate lines and bonded as the fabrics are cooling. Bonding each of the layers as they cool may reduce the overall resources required to affix the layers together and may impart a desired flexibility to the nonwoven substrate. Bonding the layers together may also be made by point bonding or melting discrete areas of the substrate, such that only the point bond and/or the discrete areas are bonded while the other portions of the layers remain unbonded to the adjacent layer(s). In another embodiment, one or more layers may be bonded via a point bond method or melting of discrete areas, while the remaining layers may be fixed along substantially the entire surface. Fixing along an entire surface may optionally be a lamination. While specific reference has been made to a spunbond-meltblown-spunbond substrate, any configuration of the nonwoven fabrics or webs may be used together using the processes referred to above. It is preferred that between two to five nonwoven fabric or web layers are fixed together to form a substrate 10, if the substrate 10 is formed from more than one layer of nonwoven fabrics or webs.

It is preferred that the nonwoven material be formed from a synthetic material, such as a polymer. Suitable materials to form the nonwoven material may include; polyolefins, low-density polyethylene (LDPE), high-density polyethylene (HDPE), polyamide, polypropylene (PP), polyvinyl chloride (PVC), polystyrene (PP), Nylon, nylon6, nylon66, polytetrafluoroethylene (Teflon), polyurethane (PU), thermoplastic elastomers (TPE), thermoplastic polyurethane (TPU), polyesters and any other common polymers known in the part for producing a web or nonwoven material suitable for use in garments and/or for insulation purposes.

Spunbonded fibres are small diameter fibres which are formed by extruding molten thermoplastic material as filaments from a plurality of fine, usually circular capillaries of a spinneret with the diameter of the extruded filaments then being rapidly reduced. Spunbond fibres are generally not tacky when they are deposited onto a collecting surface. Spunbond fibres are generally continuous and have average diameters larger than 7 (seven) microns, more particularly, between about 10 (ten) and 30 (thirty) microns. Spunbond fibres are well known in the art and may be produced by any desired method used in the art.

Meltblown fibres means fibres formed by extruding a molten thermoplastic material through a plurality of fine, usually circular, die capillaries as molten threads or filaments into converging high velocity, usually hot, gas (e.g. air) streams which attenuate the filaments of molten thermoplastic material to reduce their diameter, which may be to microfibre diameter. Thereafter, the meltblown fibres are carried by the high velocity gas stream and are deposited on a collecting surface to form a web of randomly disbursed meltblown fibres. Meltblown fibres may be microfibres or may include mircofibres which may be continuous or discontinuous, are generally smaller than 10 microns in average diameter, and are generally tacky when deposited onto a collecting surface. Microfibres may have an average size in the range of 1 microns to 4 microns. Other fibres may be optionally be used with an average size in the range of 15 micron to 4 micron and/or be between 1.5 to 3.0 denier.

Bicomponent fibres are fibres which have been formed from at least two polymer sources extruded from separate extruders but spun together to form one fibre. The polymers are usually different from each other though conjugate fibres may be monocomponent fibres. The polymers are arranged in substantially constantly positioned distinct zones across the cross-section of the conjugate fibres and extend continuously along the length of the conjugate fibres. The configuration of such a conjugate fibre may be, for example, a sheath/core arrangement wherein one polymer is surrounded by another.

Thermal point bonding involves passing a fabric or web of fibres to be bonded between a heated calender roll and an anvil roll. The calender roll is usually, though not always, patterned in some way so that the entire fabric is not bonded across its entire surface, and the anvil roll is usually flat. Compaction occurs as the calender roll compresses and bonds the substrate creating a higher density region at the bonding location 25. As a result, various patterns for calender rolls have been developed for functional as well as aesthetic reasons. The thermal point bonding leaves an array of bonding locations 25 across the surface of a substrate. Alternatively, a pair of calender rolls can be used to form the bonding locations 25 across the surface of the substrate.

Other compaction and bonding methods include; ultrasonic bonding, ultrasonic welding, air bonding, needlepunching, and hydroentangling. Hydroentangling typically processes the fibrous web with high pressure water jets, compacted by mechanical fibre entanglement in the area of the desired compaction.

Optionally, chemical bonding methods may be used to form the substrate 10. A liquid based bonding agent is applied to bond the web. Three groups of materials are commonly used as binders-acrylate polymers and copolymers, styrene-butadiene copolymers and vinyl acetate ethylene copolymers. Water based binder systems are the most widely used but powdered adhesives, foam and in some cases organic solvent solutions are also found. Print bonding, impregnation, coating, and spraying methods may be used to apply the bonding agent to the web. Print bonding may impart an embossing or pattern to the substrate.

Referring to FIGS. 1A to 1C, there is shown a breathable nonwoven substrate 10 which may be formed from any desired method known in the art. Each substrate 10 is formed from continuous filaments 15 and has a bonding array 20 comprising a plurality of discrete bonding locations 25. Optionally, the substrate may be formed from a plurality of fabric webs bonded or fixed together. The bonding locations 25 on the surface of the substrate 10 are preferably formed by thermal bonding, such as thermal point bonding, or ultrasonic bonding methods.

While FIGS. 1A to 1C illustrate a bonding array 20 with an even spacing, substrates may be formed with; irregular, randomised, patterned or graphical bonding arrays instead. A graphical bonding array 20 may impart an image or picture, such as an alphanumeric or pictogram to the substrate surface. Embossing techniques may also be used on substrates 10 to impart a texture or undulation to said substrate 10.

Referring specifically to FIG. 1A, there is shown a substrate 10 with a bond area formed from a bonding array 20. The bonding array 20 comprises bonding locations 25 formed as rounded rectangles. The bond area of FIG. 1A is approximately 22% as shown, or more generally is around 20%.

FIG. 1B depicts a plurality of bonding locations 25 which are formed from circle shapes and cover approximately 25% of the surface of the substrate 10.

FIG. 1C illustrates a bonding array 20 which comprises a "Hansen-Pennings" (H&P) pattern. The H&P pattern has square point bonding locations 25 as is shown. It is preferred that the spacing between bonding locations 25 is uniform for the bonding array 20.

The shape of the point bonding can be any predetermined shape, such as a circle, square, pentagon, diamond, cross, triangle, or any other predetermined regular shape. Some unillustrated embodiments may utilise irregular shapes for the bonding array which may be used to impart a textured surface to the substrate 10. Another suitable point bonding pattern is the expanded Hansen-Pennings or "EHP" bond pattern which produces around a 15% bond area, but may be varied to produce between a 10% to 30% bond area. The bonding area is the area which is bonded relative to the unbonded area of the substrate 10.

A further point bonding pattern is the "714" pattern which has square pin bonding areas wherein the resulting pattern has a bonded area of between 10% to 30% bonding area. The 714 pattern may commonly have approximately a 15% bonding area. Other common patterns include a diamond pattern with repeating and slightly offset diamonds with between 10% to 30% bond area, or commonly has about a 16% bond area. A wire weave pattern may be used, which may produce an array of between 10% to 30%, but typically will be around 18% bond area. Typically, the percent bonding area varies from around 10% to around 30% of the area of the web.

It is preferred that the overall bond area may cover between 5% to 50% of the surface of the substrate 10. More preferably, the bond area may cover between 10% to 40% of the surface of the substrate. In yet another embodiment, the bonding locations 25 of the nonwoven material covers at between 12% to 30% of the surface area. In other unillustrated embodiments, the bonding locations 25 cover up to 40%, or 50%, or 60% or 70%, or 80%, or 90% of the overall surface area.

In another embodiment, the bonding location array covers a minimum of 14% of the overall surface area of the substrate, or more preferably a minimum of at least one of; 15%, 16%, 17% 18%, 19%, 20%, 21%, 22%, 23%, 24%, 25% and 26%. The bonding location array may cover between 5% to 50% of the surface of the substrate. More preferably, the bonding location array may cover between 10% to 40% of the surface of the substrate.

FIG. 2A illustrates a substrate with a bonding array 20 with a plurality of bonding locations 25. The bonding locations 25 are formed with a regular shape and are evenly distributed across the surface of the substrate. A diamond or H&P pattern bonding array 20 is shown on the substrate 10. The substrate is a fibrous substrate formed from one or more webs of fibres 15. Each respective web of fibres 15 may be formed from a plurality of fibres which are all of uniform size and distribution. In another embodiment, the web of the substrate is formed with a plurality of fibres which are at least one of; unevenly distributed, and of varying fibre sizes. If more than one fibre size is used to form the web, each of the fibre sizes are evenly distributed throughout the web.

FIG. 2B illustrates another substrate which has undergone two bonding processes to form a substrate with a two bonding arrays 20, 20'. To achieve the bonding arrays 20, 20', the substrate may pass under two rollers which each impart a bonding array to the substrate 10. It is preferred that the tension of the substrate is uniform during processing such that rollers at a known spacing and orientation can be configured to impart each array 20, 20' at a predetermined location to optimise the bonding area on the substrate 10.

FIG. 2C illustrates a substrate 10 with yet another bonding array 20". The substrate as shown comprises bonding arrays 20, 20' and 20". Similar to FIG. 2B, a third roller may be used to form a further bonding array 20" on the substrate in a predetermined location. While all bonding locations are illustrated as being diamond shaped, the bonding locations may each be of a different shape and spaced either in connection with other bonding arrays 20, 20', 20", or discretely spaced from other bonding arrays. Each of the bonding arrays may also have a different compaction to allow for varying densities across the substrate 10 if desired. Having different densities may assist with controlling flexibility or rigidity of the substrate while also offering a desired compaction at predetermined locations 25. FIG. 2C is shown with a uniform compaction across all three bonding arrays 20, 20', 20". It will be appreciated that distinct or discrete locations on the substrate surface may have more than one bonding array to impart a desired movement or property to the substrate, for example, a region may be imparted with a larger surface bond area than other parts of the substrate 10, such that a different mechanical property can be imparted thereto.

Referring to FIGS. 3A and 3B, there is shown a microscope image of a substrate with a bonding array 20. The bonding locations 25 of the bonding array 20 are rectangular in shape. A close-up of a bonding location is shown in FIG. 3B, in which filaments/fibres of the substrate 10 can be seen bonded and fused together. The bonding location 25 while having a non-linear surface at this magnification, the bonding location 25 is considered to have a generally uniform thickness across the bonded area.

It has been found that the bonding array 20 may be used to alter the density of the substrate 10 by varying the spacing and size of the bonding locations 25. More particularly, it has been found that reducing bonding location 25 shape sizes while maintaining the overall bond area can yield a more dense substrate relative to a substrate with larger bonding location 25 shape sizes with the same bond area percentage.

Further, substrates may also have a higher density by reducing the bonding location sizes and increasing the number of bonding locations. This is due to the bonding location forming a shape compacted region 30, referred to herein as a 'primary region' 30, and a slope 40 adjacent the primary region 30, which is referred to herein as a 'secondary region' 40. These regions are exemplified in FIGS. 6A to 10.

The primary region 30 is the region of the bonding location 25 which has been imparted with the desired bonding location shape; in the case of FIG. 1C, a diamond shape. The bonding location 25 shape preferably has a generally uniform thickness formed by the compression and bonding or fusing of the fibres or filaments of the substrate 10. Immediately adjacent the primary region 30, a secondary region 40 with varying density is formed which has a varying density or density gradient. This is exemplified in FIGS. 7A to 10 wherein the secondary region 40 is shown rendered. The secondary region 40 extends from the primary region 30 to a non-compressed region 50. The non-compressed region 50 is a region which has generally the same density as that of the pre-bonded substrate 10.

It will be appreciated that the non-compressed region 50 may instead be a peak or crest region if the bonding locations 25 are spaced such that secondary regions 40 overlap or abut. In this way the density or thickness of the substrate 10 prior to bonding will not be observed between the bonding locations 25.

While a uniform compaction is desired, the thickness of the bonding locations 25 may vary as the volume of filaments in a web substrate may vary across the substrate by nature. Therefore, while it is suggested herein that the primary regions 30 are of a uniform thickness and/or density, they may vary in both thickness and density across a discrete primary region, however the average thickness and density across all bonding locations 25 of the array 20 will be generally the same when averaged, and a higher density will be observed at the primary regions 30 than that of the secondary region 40 and the non-compressed region 50.

Coatings and depositions may form continuous deposits or discrete deposits on the substrate 10 at the higher density regions 30, 40. This is of particular advantage in relation to deposition of a radiant barrier as larger areas can be coated which provides superior reflectance of thermal radiation relative to that of individual fibres coated with a radiant barrier.

Referring to FIGS. 4A and 4B, there are shown substrates on a heat source 1. The heat source in FIG. 4A has three sample substrates 10A, 10B and 10C disposed thereon. Each of the substrates are of the same thickness, around 30 to 100 micron. Substrate 10A has a bonding array similar to that of substrate 10B and does not have a radiant barrier deposited thereon. As can be seen thermal radiation can be observed as radiating from said substrate 10A with little thermal insulative utility.

Referring to sample substrate 10B, there is observed substantially the same structure as that of sample 10A, however a radiant barrier has been deposited onto the substrate surface. The radiant barrier is on the side not in contact with the heat source, so as to function as a low emissivity surface, and not positioned to act as a conductor. As can be observed by the darker regions, the radiant barrier applied thereto functions to reduce emissivity of thermal radiation such that it does not directly radiate from the substrate 10 as seen in sample 10A. The dots observed in sample 10B are the bonding locations 25 of the bonding array 20. Each of the bonding locations 25 have a more continuous larger radiant barrier deposit to form due to the higher density than that of the surrounding non-compressed regions 50. This can be more clearly observed in FIGS. 5A and 5B.

Physical vapour deposition (PVD), plasma enhanced physical vapour deposition (PEPVD), chemical vapour deposition (CVD) and plasma enhanced chemical vapour deposition (PECVD) are processes suitable for depositing a radiant barrier or coating onto a substrate 10. These methods have the benefit of maintaining breathability of the substrate 10 while also coating a side of the substrate with a desired deposition. It will be appreciated that these methods are generally a line-of-sight deposition method, and fibre portions in direct line with the deposition vapour will be coated, while other portions of the fibres will remain uncoated, or substantially uncoated by the vapour (see FIGS. 6A to 6D).

While the primary region 30 will generally form a linear or generally continuous surface for a radiant barrier to be deposited on, the secondary region 40 will still have a large number of gaps and space between adjacent fibres, although these fibres will be closer together relative to that of the non-compressed regions 50. In primary 30 and/or secondary 40 regions the fibres may be more closely spaced which provides for a larger continuous or semi-continuous area which has fewer or smaller gaps between fibres. In this way a surface with high infrared reflection or lower emissivity can be created thereby able to function more effectively in retaining heat. In non-compacted regions of the substrate the fibres are likely to be more widely spaced and this may allow for thermal radiation to pass more easily through the structure.

Referring to the sample substrate 10C, this substrate is formed with a different bonding array 20 than that of substrates 10A and 10B. The bonding array of sample 10C is similar in appearance to the array 20 of FIG. 1A. Each of the bonding locations 25 of the sample have a generally larger footprint, relative to that of the bonding locations 25 of sample 10B. Using larger bonding locations 25 on a substrate with a 25% bond area will not impact the primary regions 30 overall area as the bonding area of the substrate will remain the same, however having larger areas will impact the overall area secondary regions 40. As such, the substrate as a whole may have a lower density relative to that of a substrate 10 with a larger volume of bonding locations 25. The result of fewer secondary regions 40 can be observed in FIG. 4A, in which thermal radiation more easily passes through the substrate 10C. A number of bonding locations 25 can also be observed to have a ring feature around the bonding location which corresponds to the secondary region 40 and may be more effective to reflect thermal energy from a heat source 1 relative to the non-compacted region 50.

As each of the bonding locations are spaced relatively far apart, the secondary regions 40 of substrate 10C do not come into close proximity and the infrared reflectivity may be reduced or emissivity increased at the non-compacted regions 50. The non-compacted regions 50 comprise a fibres which have the largest spacing within the substrate 10 structure. While fibres may be effectively deposited with a radiant barrier 60 deposition, the effectiveness of the radiant barrier may be diminished by the non-continuous nature and/or density of the substrate in these regions as this does not provide for a surface area which can reflect radiation as easily as that of the bonded locations 25 with a radiant barrier. It will be appreciated that these regions of lower density may provide for a desired flexibility, drapeability, breathability and/or feel to the substrate. Increasing the bonding area or altering the bonding array 20 may impact these properties or impart other properties in regions of the substrate 10, such as rigidity or abrasion resistance for example.

The size of the secondary region 40 extending from one side of the primary region 30 of the bonding location 25 may depend on the compaction of the filaments at the bonding location 25. For example, substrates 10 with a thickness of between 10 micron to 200 micron in thickness, smaller bonding locations 25 at more closely spaced intervals have been observed to provide a larger secondary region 40 comparatively to that of larger bonding locations 25, as is exemplified in FIG. 4A. It will be appreciated that the thickness of the substrate will impact the secondary region density, however substrates 10 of any thickness will also have a secondary region 40 which is imparted by a bonded or compacted location, however the observed density of the secondary region may vary depending on the thickness and material of the substrate being used.

The secondary region 40, provided that the bonding location compaction and observed bonding is the same across all bonding locations 25 regardless of area, will result in generally the same secondary region 40 conditions (i.e. width and/or gradient and/or density). As such, the volume of secondary regions 40 can be increased or decreased relative to the size of the bonding locations 25. It will be appreciated that the rigidity of the fibres at the bonding locations may also affect the secondary region of the substrate.

For example, a substrate having a 25% surface bond area, featuring square/diamond bonding location 25 shapes with an area of 25 mm$^2$ (primary region 30) may have a secondary region of a width 2 mm extending around the respective bonding location 25. While a substrate having a 25% surface bond area featuring square/diamond bonding locations 25 with an area of 6.25 mm$^2$ (primary region 30 which is ½ height and ½ width relative to the 25 mm$^2$ primary region), the secondary region 40 may have a secondary region 40 width the same as that of the larger bonding area shape, i.e. approximately 2 mm extending from the bonding location primary region. Therefore, it would be observed that with half of the surface bonding area, a substrate 10 having a larger number of bonding locations 25, the secondary regions 40 of this substrate 10 may be equal to or up to 30% greater than that of the secondary regions 40 observed for the substrate with the larger bonding locations 25. This is to say that an increased number of bonding regions with reduced size, while maintaining the same overall bond area, may yield a substrate with a larger overall volume of secondary regions 40 being formed. In this way the bonding energy/adhesive required can remain generally constant while providing for a substrate with a larger overall secondary region. This may increase the emissivity of the substrate 10 without reducing the other properties of the substrate, such as breathability.

It will be appreciated that the substrates 10 of the present disclosure are preferably deposited or coated with a radiant barrier 60. Other depositions or coatings may also be applied to the radiant barrier 60 which may assist with protection of the deposited material. For example, a clear coat or IR transparent protective coating (not shown) may be applied to the substrate 10 to protect the radiant barrier 60 deposited thereon. Any coating disposed on the substrate may also be a functional coating which can also provide protection to the deposition on the substrate 10 or to the substrate 10 itself.

A substrate is shown in FIGS. 5A and 5B in which a radiant barrier 60 has been deposited thereon. The radiant barrier 60 may be applied by PVD or CVD methods as discussed above. As can be seen, the largest continuous areas of the deposition correspond to the bonding array 20 bonding locations 25. Preferably, the PVD or CVD methods are metallisation methods in which a radiant barrier 60 or low emissivity layer 60 is applied to the substrate 10. It will be appreciated that a radiant barrier 60 and a low emissivity layer may be the same. Deposition methods are preferred over application of films as deposition allows for breathability of the substrate, which is highly desirable for use in garment and upholstery applications. However, if desired, the radiant barrier may be a film if the final application requires no, or little, breathability.

FIG. 5B shows an enlarged view of the deposition on a bonding location 25. The bonded location 25 as shown has a generally continuous radiant barrier formed thereon. As can be seen further away from the bonding location, the fibres are also coated with a radiant barrier, however the spacing of fibres 15 is greater than that of the of the portion of the fibres immediately adjacent the boding locations 25.

Further, the bonding locations 25 may assist with restricting movement of the fibres immediately adjacent, and likely extending therefrom, which form the secondary region 40. In this way the density of the secondary region 40 can be predicted more effectively. Increasing the density of the substrate may allow for improved emissivity properties and/or radiant barrier properties to be imparted to the substrate by layer 60. Layer 60 (as shown in FIGS. 5A to 6D) is preferably a deposit of a low emissivity material, such as aluminium, which can reflect thermal energy or lower the emissivity of the substrate to reduce thermal radiation loss. The effectiveness of the low emissivity layer will be impacted by the densities of the substrate locally. As such, having higher densities is more likely to reduce emissivity of the substrate and/or improve the radiant barrier properties of said substrate 10. This is observed in FIGS. 4A and 4B, wherein the secondary region 40 and the primary region 30 coated with a radiant barrier 60 reduces the observed emissivity of the respective substrates 10B, 10C. Preferably the radiant barrier 60 has an emissivity less than 0.35.

Optionally, a primer coating layer (not shown) may be provided between the substrate 10 and the radiant barrier 60 to improve adhesion of the radiant barrier and/or provide protection to the radiant barrier 60 or the fibres 15 of the substrate. The primer may be formed from any predetermined organic or inorganic coating. The thickness of the primer is preferably in the range of 10 nm to 500 nm, or more preferably between 10 nm to 200 nm. It will be appreciated that a protective coating applied after metallisation (deposition of the radiant barrier 60) may have a thickness of between 10 nm to 1000 nm or greater, depending on the coating applied. Preferably, a functional coating is applied to the substrate after metallisation. Other methods, such as plasma treatment, may be used to oxidise the radiant barrier after deposition to form a hard outer shell on the radiant barrier while maintaining desired emissivity and or reflectance properties. For example, $AlO_x$ layers may be formed on a radiant barrier 60 formed from aluminium.

Referring now to FIGS. 6A to 6D, there are shown embodiments of a nonwoven substrate 10 with a bonding array 20 thereon. The bonding locations 25 of the bonding array are illustrated as generally rectangular features with fibres extending therefrom. However, in some embodiments the bonding locations may be undulated, or imparted with a texture if desired.

FIG. 6A illustrates a substrate which has passed through a double calender roller apparatus, such that the axis of the bonding location 25 is generally in line with the axis of the substrate 10 as a whole. On the upper surface of the substrate 10 there is a deposit of material. The deposit of material in this embodiment is a radiant barrier 60. The radiant barrier 60 may be a metal deposition, which may be formed from aluminium, copper, gold, silver, carbon (such as diamond-like carbons or tetrahedral amorphous carbons), cadmium, zinc, indium, tin, titanium, bismuth, zirconium, zirconia, any combination of materials aforementioned or any of their alloys and/or oxides. or any other low emissivity material (preferably a metal or metal alloy) which may reflect radiant energy. The primary 30, secondary 40 and non-compacted 50 regions are also illustrated which are of varying densities and fibre 15 spacing. The primary regions 30 of the bonding locations 25 are generally linear on their upper and lower surfaces. As such, a deposition of material may more easily be deposited thereon and form an area of radiant barrier which may be equal to or larger than the area of the bonding location 25. The deposition area may be larger as fibres adjacent to the bonding location 25 (i.e. the secondary region 40) may also be compacted or closely spaced to allow for bridging or lining of deposited material across fibres. In this way the radiant barrier 60 surface area can be increased.

The interface between the primary region 30 and the secondary region 40 will have a higher density relative to the non-compacted region 50. The secondary region 40 will have densities varying from approximately the average density of the primary region 30 to the density of the non-compacted region 50. The change in density at the second region 40 may not be a linear density change, and may be a non-linear gradient of change, depending on the thickness and the fibres of the substrate 10.

The thickness of the radiant barrier 60, which is preferably aluminium (aluminium) is preferably in the range of 10 nm to 200 nm, or between 30 nm to 100 nm, or between 50 nm to 100 nm, or any desired thickness within the range. Preferably, the aluminium deposition thickness is 100 nm or less, or 70 nm or less, or 50 nm or less, or 30 nm or less. Thicknesses as discussed allow desired emissivity and/or radiant barrier properties to be imparted to the substrate 10. It will be appreciated that other thicknesses greater than 100 nm may also be used to achieve a similar function. While a radiant barrier layer or coating may be discussed herein, it will be appreciated that the radiant barrier 60 is disposed on fibres 15 of the substrate 10 and therefore a continuous radiant barrier layer may not be present, but rather fibres are deposited with a radiant barrier 60 deposition.

Semiconductor coatings may be applied by CVD or PVD processes and said coatings may be doped with at least material elected from the following group: cadmium, zinc, indium, tin, copper, titanium, bismuth, gold, silver, zirconium, zirconia, any combination of materials aforementioned or any of their alloys and/or oxides. Optionally, such coatings may be used to protect a low emissivity layer from mechanical damage, such as an aluminium layer. Coatings applied to a substrate can be set using heat, or can be set using a catalyst, or can be set using a plasma treatment.

Tin oxides may have particular utility for use as a radiant barrier or may be used in combination with a metal layer or a radiant barrier. Tin oxides may be applied using CVD processes and offer a high transparency for visible light and provide a high reflectance for infrared light (or infrared radiation).

In a preferred embodiment, an organic or in-organic protective coating (or protective layer) may be applied to the substrate 10 before or after a deposition process. The protective coating may be produced by a process of chemical vapour deposition, plasma enhanced chemical vapour deposition, plasma polymerisation, glow discharge deposition or other vapour deposition or vacuum vapour deposition techniques known in the art. The substrate 10 may be pre-treated by a cleaning, and/or etching and/or activation step using plasma before deposition and/or before applying a coating. The protective coating may be deposited from two or more processes whereby a coating may be applied on a first surface of the substrate 10 and then again on the second surface. Alternatively, the protective layer or coating may be applied in a bath or spray such that only a single process is required. In another embodiment the protective coating is applied in a single uniform coating that coats both surfaces of said substrate 10 without significantly reducing the moisture vapour permeability of the substrate 10.

In at least one embodiment, the organic or in-organic coatings are functional coatings. Functional coatings may include hydrophobic and/or oleophobic coatings which may optionally contain fluorinated functional groups and/or monomers that create a nanostructure on the textile surface. Other hydrophobic and/or oleophobic treatments may also be used which exclude the use of fluorinated functional groups to reduce impact on the environment, these treatment processes will be readily understood by persons of skill in the art.

The organic or in-organic coating may also comprise one or more other functional components to provide additional functionality to the composite including: antimicrobial coatings from a monomer and/or sol-gels with antimicrobial functional groups and/or encapsulated antimicrobial agents (including chlorinated aromatic compounds and naturally occurring antimicrobials). Fire retardant coatings from monomers and/or sol-gels with a brominated functional group. Self-cleaning coatings from monomers and/or sol gels that have photo-catalytically active chemicals present (including zinc oxide, titanium dioxide, tungsten dioxide and other metal oxides). Ultraviolet protective coating from monomers and/or sol-gels that contain UV absorbing agents (including highly conjugated organic compounds and metal oxide compounds).

FIG. 6B illustrates a similar embodiment as that of FIG. 6A, but with a radiant barrier disposed on the lower surface of the substrate 10. It will be appreciated that both the upper and lower surfaces of the substrate may be provided with a radiant barrier deposition if desired.

FIG. 6C illustrates a further embodiment of a substrate 10. The substrate 10 has been manufactured with a calender roller and an anvil roller which can offset the bonding location relative to the unbonded axis of the substrate 10. The bonding location as can be seen is lower to the bottom of the substrate 10 than the embodiments of FIGS. 6A and 6B.

In this configuration, the secondary region 40 may have a higher density relative to that of the secondary regions 40 of FIGS. 6A and 6B. It can be observed that the distance between the upper surface of the primary region 30 (of FIG. 6C) and the upper surface of the non-compacted region 50 is greater than that between the upper surface of the primary region 30 and the upper surface of the non-compacted region 50 of FIGS. 6A and 6B. As such, the secondary region 40 density will be different. This can be seen in more detail in FIGS. 9 and 10.

The upper surface of the substrate 10 of FIG. 6C has been deposited with a low emissivity material 60. The low emissivity material 60 may be any predetermined low emissivity material and preferably may function as a radiant barrier. Due to the air gaps formed between the upper surface of the primary region 30, and the upper surface of the non-compacted region 50, the substrate 10 may function more effectively to reflect and retain heat using the radiant barrier 60.

FIG. 6D illustrates yet a further embodiment of a substrate 10. The substrate of FIG. 6D is similar to that of FIG. 6C, except that the substrate of FIG. 6D has a radiant barrier 60 coated on the lower surface of the substrate rather than the upper surface of the substrate. A radiant barrier 60 deposition on the lower surface of the substrate in this configuration may provide for a larger deposition at the bonding locations 25 to be observed as a higher density portion of the second region is likely to be local the lower surface of the substrate 10 (see FIG. 9).

It will be appreciated that the radiant barrier 60 may be adapted to function as a low emissivity surface depending on the heat source location. A low emissivity surface may be used to prevent or substantially prevent radiant radiation emitting from the substrate 10 in a predetermined direction.

Turning to FIG. 7A there is shown a 3D render sectional view of a bonding location 25. The bonding location has been 3D modelled based on a predetermined fibre size and density. Fibres 15 of the substrate 10 are disposed in a random orientation which simulates the nonwoven nature of the substrate. The general shape of the fibres 15 acting as a single structure has been overlaid on the render. This has been done to enable an analysis of the densities of the substrate 10 at the bonding locations 25.

FIG. 7B shows the shape of the fibres acting as a single structure filled in as shows a 3D block render of the general shape imparted after bonding. The bonding location shape will have an impact on the how the fibres in the secondary region 40 behave and are compacted. For simplicity the shape elected here is a square, however any bonding location shape may be used. As shown, the bonding location 25 general shape is a rectangular prism of a uniform thickness which represents a uniform density across the bonding location 25. The walls of the bonding location, which are part of the secondary region 40, are curved which is a result of the tension of the fibres 15 in combination with the modulus of the fibres imparting a force urging the fibres back into a non-compacted orientation.

FIG. 8 illustrates a sectional view of a bonding location on a substrate. The darker regions of the bonding location indicate a higher density present at these regions. As can be seen, the primary region 30 will have a relatively higher density than that of the non-compacted region 50. The secondary region 40 will have regions in which the fibres are more closely spaced together, such as near to the primary region 30. In the higher density regions, a substrate with a radiant barrier 60 thereon may reduce the emissivity of the substrate 10 and thereby function to insulate. This may be of particular advantage in clothing as thin layers can be stitched or combined with typical garments, such as coats and suits, to provide a significant increase in warmth for little added weight from the substrate 10.

FIG. 9 illustrates an embodiment of a substrate 10. The substrate 10 may be constructed using a calender roller and anvil roller. As can be seen, the bonding location 25 is nearer to one side of the substrate, similar to that of FIGS. 6C and 6D. The dark area of the secondary region as shown has a higher density of fibres as a result of the bonding at the primary region. This higher density can assist with forming a desirable low emissivity surface when a radiant barrier 60 is applied to the substrate 10. While not shown in this Figure, a radiant barrier 60 can be applied to the substrate 10. Further, it will be observed that there is a higher density at the secondary region in the substrate of this embodiment, relative to the embodiment of FIG. 10. This is due to the greater distance between the surface of the primary region 30 and the surface of the non-compacted region 50. Therefore, utilising a substrate with this bonding configuration may provide for a superior substrate when deposited with a low emissivity surface which shows improved radiant barrier properties and/or improved emissivity properties which can be used for thermal insulation purposes.

Fibres 15 in the secondary 40 and/or primary 30 regions may also be under tension due to the bonding location 25, which may assist with maintaining the density in these regions after bonding, and may also assist with recovering from deformations.

FIG. 10 illustrates a further embodiment of a substrate 10. The substrate 10 may be constructed using a pair of calender rollers to form a bonding location 25 near to the centre of the substrate, which is generally in line with the axis of the substrate 10, similar to that of FIGS. 6A and 6B. As can be seen, the darker the regions of the regions 30, 40, 50 as shown the more compact (i.e. higher density) the substrate.

It will be appreciated that the brighter region illustrated in FIGS. 9 and 10 near to the interface between the primary region 30 and the secondary region 40 is for more easily viewing the interface between these two regions and the density at this region will generally be the same as that of the primary region 30.

Bicomponent fibres may be used to form a portion of the nonwoven substrate 10. Bicomponent fibres may be comprised of two or more materials, but will typically comprise a sheath portion and a core portion. The sheath of the bicomponent fibres may have a lower melting point than that of the core of the fibre, which allows the sheath to be at least partially melted or deformed by thermoforming methods and/or ultrasonic welding methods. This can fuse several adjacent or local fibres together while maintaining the integrity of the core of the fibre. An example of a bicomponent fibre may include nylon6 (sheath) and nylon66 (core). Other fibres may also be used if desired. In at least one embodiment, the fibres are homogeneous and are preferably either polyethylene or polypropylene fibres. However, any predetermined fibres which may be bonded or embossed may be used with the present invention.

The bonding of the fibres at the bonding locations 25 melts an exterior or sheath of the fibres 15 of the substrate 10 locally. The bonding process causes a melting of the fibre sheaths and subsequent compaction and bonding with adjacent fibres. Each of the adjacent fibres, once bonded, are set in the bonded configuration.

With higher bonding areas, the stiffness of the substrate will also likely increase, which can result in low drapeability or comfort. Therefore, depending on the application, the overall bonding area of the substrate will be varied to allow for a desired flexibility and/or stiffness.

In yet another embodiment, the array 20 can be offset, staggered, lined, rowed, grouped, or disposed in any predetermined orientation. Optionally, arrays may receive multiple bonding processes in which at least a portion of the primary region 30 is compressed by a calender roller after formation. In this way the array shape can be modified by further processing. Optionally, existing arrays may receive further compression and bonding processes in the primary 30 and/or secondary 40 regions to modify or augment the substrate properties further. As an example, a primary region 30 may receive an additional compression and bonding to further increase the density of a portion of the primary region, which may be used to assist with forming an improved low emissivity surface, or provide air gaps, or provide for any other desired property to be imparted. The bonding locations of the illustrations may be exaggerated for ease of viewing. However, depending on the thickness of the substrate, the bonding locations 25 may compact the fibres of the substrate less than that compaction of around 50% as is illustrated. It will be appreciated that for high-loft, or less dense substrates, the bonding locations may achieve compaction of up to 95%.

Optionally, increasing the size of the bonding locations 25, or reducing the distance between bonding locations 25 can result in more fibres (or a larger portion of the length of fibres) being bonded. This may allow for an abrasion resistant property to be imparted to the substrate, which can be beneficial if this side of the substrate is not coated with a radiant barrier. However, the corresponding increase in bond area of the nonwoven substrate 10, bending stiffness (i.e., stiffness) also increases, which may be inversely proportional to the flexible feeling.

In yet another embodiment, the substrate 10 may be formed with a point unbonded (PUB) array. The unbonded array includes fabric or substrate discrete areas surrounded by bonded regions. The overall surface area of the bonded area relative to the unbonded area may be in the range of 10% to 50% of the overall surface area. The PUB array may be formed from any predetermined pattern or array and be used to form an abrasion resistant surface or grippable surface. Further, a substrate formed from discrete unbonded regions may be relatively stiffer than a substrate 10 formed from discrete bonded regions surrounded by unbonded regions, as is illustrated in the attached Figures.

Optionally, the substrate can be perforated or apertured by stretching after bonding according to known techniques. This may achieve a desired breathability, stretch property, flexibility or predetermined function.

The substrates 10 may be used to manufacture garments which reduce the thermal signature of a body by 30% to 95% relative to the reduction provided by standard/conventional fatigues or garments. As such, the substrates 10 may have advantageous use in active zones or other military applications. If the radiant barrier is used for radiant masking the radiant barrier may have a thickness in the range of between 30 microns to 500 microns. A garment may include any type of non-medically oriented apparel which may be worn such as industrial work wear and coveralls, undergarments, suits, pants, shirts, jackets, gloves, socks, or any other wearable item of clothing.

The substrate 10 may be positioned adjacent to at least one insulation layer, or adjacent to a woven or knitted material and form part of a composite material. In one embodiment, two substrates 10 disposed adjacently may form a composite material. In a composite material any number of layers of substrates 10 or configurations of substrates may be used.

The textile composites 100 may be formed with at least one metal layer, forming a radiant barrier, with each layer of the textile composite 100 being a substrate of the textile composite. The radiant barrier 120 can be used to prevent heat loss via radiation from the human body. The textile composite 100 may also include at least one insulating layer, such as a fibre-based insulation material, to protect the metal layer and also reduce heat loss via conduction and convection. The metal layer 120 may have variable thicknesses to allow for differentials in radiant barrier protection or for radiant reflection properties.

Preferably the radiant barrier 120 acts as an insulation layer, and may provide a barrier against radiative heat loss, and the fibre-based insulation material provides insulation against heat loss via conduction and convection. The use of a radiant barrier may allow the fibre based insulating material to be constructed at a much lower density and/or thickness than conventional insulations thereby creating a significantly thinner and lighter composite of equivalent thermal resistance while optionally providing improved compression resistance and durability. Further reducing the thickness of the insulation layer or using more coarse fibres may increase the number of washes a garment formed with the textile composite 100 may be subjected to before a significant decrease in loft of the insulation, or more generally the warmth provided by the garment.

In an embodiment, the textile composite 100 is an insulating composite that has reduced weight and thickness compared to conventional fibre insulation layered systems commonly used in clothing, apparel or garments, herein collectively referred to as "garments". Said insulating composite comprises an insulating material and at least one radiant barrier or the composite comprises a substrate and metal layer. Preferably, the radiant barrier is a metal layer such as aluminium, silver, gold, or any metal layer which has a high luster (lustre) generally in the range of submetallic lustre to adamantine lustre. The insulating composite is configured such that insulating material provides insulation against conductive and convective heat loss and the radiant barrier provides insulation against radiative heat loss or other predetermined radiation depending on the metal/material selected for the radiant barrier.

In another embodiment, the metal layer 120 is adjacent to at least one fibre-based insulation layer 130. The insulation layer is configured to provide insulation against thermal conduction and convection, said radiant barrier 120 is configured to provide insulation against infrared radiation. It will be appreciated that the radiant barrier may be suitable for masking or insulating the infrared range primarily radiated by a human body or other similar radiant source, which is dominant in the 12 micrometre wavelength and typically in the infrared spectrum between 7 micrometre and 14 micrometres. It will be appreciated that other spectrum wavelengths may be masked or insulated depending on the desired application. Masking an infrared range may be related to the radiant barrier material, the fibre-based insulation a face layer of the textile composite 100, the thickness of the textile composite 100 or part thereof, or may be provided by the textile composite as a whole. For example, the radiant barrier may provide infrared masking or insulation, and the face layer (most distal layer) may be suitable for masking, insulating or dampening UV radiation. The textile composite 100 may also include other barriers, such as chemical barriers which may repel water or other fluids or may be radiation resistant or reflect gamma and/or beta and/or alpha radiation.

In yet another embodiment, the metal layer 120 is applied to a woven, stretch woven, knitted or non-woven substrate, in which the metal layer has been produced via the process of vapour deposition. The vapour deposition may be applied in a vacuum to produce a uniform metal layer, or a layer substantially free of contaminants. In another embodiment, said metal layer is applied to a moisture vapour permeable substrate formed of a film, textile, or textile and film composite. In other embodiments, the metal layer is applied to a moisture vapour permeable and substantially liquid impermeable substrate formed of a film, textile, or textile and film composite. It will be appreciated that the metal layer may also be referred to as a "metal substrate" and/or a "radiant barrier".

While reference has been made to a metal layer being a radiant barrier for the textile composite 100, other materials may be suitable for use as a radiant barrier. For example, the following radiant barriers may be used; coatings (comprising metal filings, metal flakes, ground metal, metal dust or any other desired metal structure), ceramic beads, sodium borosilicate, alumina, beryllia, magnesia, yttria and spinal. It will be appreciated a radiant barrier for a textile composite 100 is preferably flexible when the radiant barrier has a thickness of between 0.01 nm to 100 µm. Coatings, films and/or non-metallic radiant barriers may optionally be applied by a vacuum glazing process.

Radiant barriers may also include semiconductors, metal oxides and/or black pigment. Binders for such radiant barriers may include olefin based polymers, acrylics, and urethanes. Semiconductor coatings may be applied by CVD or PVD processes and said coatings may be doped with at least material elected from the following group: cadmium, zinc, indium, tin, copper, titanium, bismuth, gold, silver, zirconium, zirconia, any combination of materials aforementioned or any of their alloys and/or oxides. Optionally, such coatings may be used to protect a low emissivity layer from mechanical damage, such as an aluminium layer. Coatings applied to a substrate 110 can be set using heat, or can be set using a catalyst, or can be set using a plasma treatment.

Aluminium layers or radiant barrier layers may be applied using PVD, or PEPVD methods. In addition, protective coatings may be applied to the radiant barriers and substrates which the radiant barriers are disposed on. The protective coatings may be applied by functional chemical coatings, or may be formed by oxidation of an applied layer which can protect adjacent coatings or layers. For example, a controlled volume of oxygen may be introduced at the time of radiant barrier application which can cause a controlled oxidation layer to be formed adjacent the radiant barrier. If aluminium is used as the radiant barrier, the protective coating may be an $AlO_x$ coating.

In a further embodiment, the textile composite 100 is constructed such that there is a first substrate and first insulation substrate adjacent to the first surface of said first substrate and a second substrate adjacent to the opposite side (other side) of the insulation substrate. More simply the insulation substrate is disposed between the first and second substrates. As substrates are generally planar, they may be considered to be a sheet of material and therefore have two sides; a proximal side and a distal side. A radiant barrier or metal layer may be provided on a single surface or both of the surfaces of each of the first and second substrates adjacent to said insulation substrate. It will be appreciated that the metal layer or radiant barrier may be bonded with a respective first substrate or second substrate and the insulation substrate may or may not be bonded to another substrate. In another embodiment, the insulation substrate is stitched, sewn, tacked, pinned, or otherwise selectively attached to at least one of the first substrate, the second substrate and/or the metal layer (or radiant barrier) on the first and/or second substrates.

In a further embodiment, additional organic and inorganic coating layers may be deposited before and/or after said metal layer is applied to a substrate in order to improve adhesion to said substrate and/or prevent corrosion, abrasion and/or achieve a lower emissivity by creating a smoother reflective surface. Shining techniques may be used to increase the reflectiveness of the radiant barrier after deposition or after bonding resulting in a relatively higher reflectance and therefore provide improved reflectance of thermal radiation. Optionally, the metal layer can have increased corrosion resistance and/or abrasion resistance by oxidising the surface of a metal coating. This may be achieved by using a plasma comprising oxygen, or by introducing an oxygen at the contact interface of the substrate and the metal layer during the time of deposition to form a self-protective metal oxide layer. For example, if an aluminium metal is to be deposited onto the substrate, the oxide layer will be an aluminium oxide ($AlO_x$). $AlO_x$ can provide for a superior bond relative to pure aluminium and may allow for improved adhesion or bonding of metal layers, functional coatings, protective coatings and/or bonding to substrates or layers of the textile composite 100.

Functionalisation of the various coatings can also be optionally included, and alternative embodiments of the present invention may also have extra material layers (substrates) in the composite. Any layer or substrate may be functionalised to be flame retardant, UV absorbing, self-cleaning, hydrophobic, hydrophilic, statically charged and/or antibacterial.

In an alternative embodiment, said metal layer is applied to said substrate by means of transfer metallisation whereby a thin metal film or foil is coated onto a release substrate via vacuum vapour deposition or other method and then adhered onto said substrate. As used herein, the term "metal" includes any elemental metals and their alloys.

Referring to FIG. 11 there is illustrated an embodiment of a textile composite 100, the textile composite has a substrate 110 with a metal layer 120, insulation layer 130 adjacent to said metal layer and additional substrate 140 adjacent to the opposing surface of insulating layer. The metal layer 120 may be bonded with the first substrate 110 and the insulation layer 130 may form an abutting relationship with the metal layer 120. The metal layer 120 may be a radiant barrier and/or a low emissivity layer formed on a substrate 110 or bonded with a substrate 110. Substrate 110 and additional substrate 140 may be formed from substantially the same material, but may optionally be formed from a different process. Any desired process to form the substrates 110 and 140 may be used. Alternatively, substrate 110 may be pre-treated with a chemical or functional treatment to provide water resistance or abrasion resistance prior to the application of the metal layer, or post treated with a chemical or functional treatment after application of a metal layer 120. The chemical or functional treatment may be a protective coating which can provide abrasion resistance and/or water repellency to the substrate and/or the metal layer 120. Maintaining the integrity of the metal layer may improve the lifespan of a garment formed from the textile composite 100. While the insulation layer is shown as a generally linear substrate, however any predetermined substrate shape may be used.

While the insulation layers 130 are shown as a generally linear substrate, any predetermined substrate shape may be used. The surface contact area between the insulation layer 130 and the metal layer 120 is preferably around 5% surface contact area to 60% surface contact area. In other embodiments the surface contact area may be up to 100%. However, it will be appreciated that fibre insulation materials of the insulation layer 130 may have voids or gaps in the structure and therefore fibre contact area between the metal layer and the fibres of the insulation layer may be less than the surface contact area. As such, an actual contact area is the total contact surface area multiplied by the fibre contact area. The density of the fibres, spacing of the fibres, and thickness of the fibres may all be relevant to the fibre contact area. This is to say that while 50% of the surface contact area of the insulation layer may be in contact with an adjacent layer, such as a metal layer 120, the voids in the insulation layer may result in approximately 0.1% of the metal layer 120 surface area being in direct contact with fibres of the insulation layer. For example, if there is a 5% contact between the metal layer 120 and the insulation layer, there is 95% of the surface area not in contact with the insulation layer. However, if the voids of the insulation layer are 80% across the surface (therefore 20% fibre contact area in said 5% surface contact area), then the actual contact area between the fibres of the insulation relative to the metal layer will be 1% (5%*0.20=1%). Therefore, the fibre spacing is preferably within a predetermined range such that the actual contact surface area can be calculated. It will therefore be appreciated that a radiant barrier may be impacted by the surface smoothness or surface texture of an insulation layer, as such an insulation layer surface may be formed with predetermined void arrangements or a predetermined shape or porosity to achieve a desired actual contact area in a desired range. The areas of the metal layer 120 not in contact with the insulation layer will have a higher reflectance as heat radiation will not be absorbed by the insulation before being reflected and therefore improve radiant barrier protection. As such, it is desirable to form the insulation material with a high porosity or a high void space as this may improve the reflectance of the radiant barrier.

Instances in which the insulation layer 130 is to be formed with a higher density to maintain a desired shape or to support an adjacent layer or substrate. For example, the insulation layer as illustrated in FIG. 4A may be formed from a high-density material (such as a closed cell foam) such that there are substantially no voids within the insulation layer and therefore the contact surface area of the insulation layer is also the actual contact surface area. In an embodiment, the fibres of the fibre insulation layer may have a thickness in the range of 10 micron to 50 micron and the fibres may be hollow core fibres. However, it may be advantageous in other embodiments to provide for a fibre with a solid core to increase the density of the fibres and also the resilience of the insulation layer. It will also be appreciated that the actual contact area of the insulation layer and the metal layer 120 may change during wear as portions of the textile 100 will be compressed or stressed causing the deformation of the textile used in a garment. Therefore, the textile 100 may further comprise a spacer which may limit the changes in actual contact surface area between the insulation layer and the metal layer 120 or a spacer may be used instead of an insulation layer.

As each substrate is generally planar, each substrate of the textile has a first side (first surface) and at least a second side (second surface). The first side of the substrate facing in a direction which is opposed to the second side of the substrate. In the embodiments of the textile composite 100 illustrated in FIGS. 11 and 12, substrate 110 is the most distal layer and substrate 140 is the most proximal layer, and reference may be made to these directions.

In another embodiment, the metal layer 120 is disposed on substrate 140 such that the metal layer is proximal the insulation layer 130, and therefore metal layer 120 is between the insulation layer 130 and the substrate 140. Having the metal layer disposed between the insulation layer 130 and the substrate 140 may reduce the potential for condensation to form on the metal layer 120, which is particularly of use when using the textile 100 in cold weather gear or winter garments. Condensation may be reduced or eliminated as the temperature differential or temperature gradient between the proximal side and the distal side is smaller. As a non-limiting example, the textile may be adapted to have a temperature gradient in the range of 0 to 15 degree Celsius (a relative difference in temperature between the side of the metal layer) without condensation forming. Therefore, a hydrophilic membrane or coating may not be required near to the metal layer, or the garment is less likely to get wet from condensation and keep the wearer warmer. As the textile 100 may have significant utility for winter sporting wear or winter wear. Further, as a low emissivity surface reflects and does not emit radiation, heat generated from a wearer may be prevented from radiating and thereby keeping a wearer warmer. While having a low emissivity layer (such as the metal layer) near to a source of heat, it will be appreciated that there is a barrier preventing the low emissivity layer from contacting the source of heat so as not to act as a conductor. In another embodiment, the low emissivity layer (such as a metal layer) may be desirably in contact with a wearer to cool a wearer. Such an arrangement may have beneficial use for summer or warm weather wear as the metal layer may conduct heat away from a radiant energy source keeping the wearer cooler.

In another embodiment shown in FIG. 12, a second metal layer 150 is disposed on substrate 140. As such, the insulation layer is bound between two radiant barriers or two metal layers. The metal layers may be the same material or may be different materials for different applications. For example, metal layer 120 may be formed from a higher density material to absorb radiation (photons) external the garment, and metal layer 150 may be a radiant barrier with a generally lower density. In addition, only one of the metal layers may be shined or have a higher lustre to improve radiant barrier protection. Optionally, metal layer 120 has a higher reflectance and/or lower emissivity than metal layer 150 such that thermal energy is more likely to pass through metal layer 150 and be substantially retained, at least temporarily, between metal layers 150 and 120. This may cause increased warmth of the wearer of a garment formed with the textile composite 100. Alternatively, metal layer 150 has a lower emissivity and higher reflectance relative to metal layer 120. Preferably, the insulation layer is not bonded to the metal layers. However, it will be appreciated that the insulation layer may be bonded to at least one of the metal layers to reduce the actual contact area between the metal layers and the insulation. Bonding the insulation to the metal layer(s) may be achieved by adhesive, ultrasonic welding, gluing, sewing, pinning, stitching or may be fixed while the metal layer is drying. It preferred that bonding of the layers of the textile 100 is a chemical bonding to improve bond strength and also reduce production time and textile thicknesses by avoiding the use of an adhesive. Chemical bonding may also provide for a more preferred flexibility or drapability of a textile used for a garment relative to a textile with an adhesive layer.

Embossing of substrates or layers (110, 130, 140) may provide further advantages in relation to radiant barriers and/or substrates adjacent to radiant barriers. The embossing may be used to create an air gap which can improve the function of the radiant barrier, which may be particularly useful for clothing, manchester, curtains, insulation, building, and furniture applications.

To improve the air gap generated from embossing substrates, the substrates may be formed from elastomeric materials which may allow greater deformation and embossing patterns to be formed in substrates without puncture or perforation of the substrate. Preferably, the embossing process will plastically deform the substrate in predetermined regions or in a predetermined pattern such that deformation of the embossed pattern will be elastic deformation during normal use such that the embossed pattern or array will return to the embossed configuration.

Preferably, the substrate comprises a thermoplastic elastomeric (TPE) material. TPEs may be a material which is an elastomeric material with a softer and more flexible texture than conventional plastics.

TPEs may have properties similar to that of rubber, which may be readily deformed during embossing processing and may be embossed to retain a desired shape. TPEs are elastic materials, and in some instances may be recycled and are generally non-toxic. TPEs can be moulded or extruded with PP, PE, PC, PS, EV, ABS or PA (Nylon) through integration or separately.

TPE may be used to form the substrate, or part thereof, in which the TPE may include at least one material selected from Styrenic block copolymers, TPS (TPE-s), Thermoplastic polyolefinelastomers, TPO (TPE-o), Thermoplastic Vulcanizates, TPV (TPE-v or TPV), Thermoplastic polyurethanes, TPU (TPU) Thermoplastic copolyester, TPC (TPE-E), Thermoplastic polyamides, TPA (TPE-A), Not classified thermoplastic elastomers, TPZ.

Styrenic block copolymers or styrene elastomers may include at least one material selected from the following group; SBS, SEBS, SIS, and SEPS. Other styrene or elastomer additives may be used to improve at least one of; feel, stretch, resilience or tensile strength of the substrate. It will be appreciated that thermoplastic elastomers may also be referred to as thermoplastic rubbers.

TPE may also be referred to as a thermoplastic rubber (TPR) material. TPE materials may provide utility for use as a substrate as these materials relatively more durable to weather conditions and UV light exposure than vulcanised elastomeric materials. It will be appreciated that the elastomeric materials may optionally include vulcanised rubbers or elastomers in some embodiments if the exposure of the elastomer is not generally exposed to such conditions.

TPE materials may have a hardness in the range of: SHORE 0A~SHORE 70D, and may be resistant to chemical and weather degradation or corrosion. These materials may also have the benefit of needing only a low compression for deformation while having a high tensile strength, which may allow these materials to be embossed with a desired pattern and/or array. Embossing these materials may be achieved using heat and a mould or other deformation device. Heating TPE materials for deformation may only be required to be in the range of 70° C. to 80° C. depending on the TPE material and additives used. Examples of TPE materials are; TPV, TPEE, TPU and TPR materials which are discussed below.

Thermoplastic vulcanizate (TPV) material is classified as polyolefin thermoplastic elastomer family, it is a dynamically vulcanized EPDM (synthetic rubber)+PP (polypropylene). This material has heat resistance and low compression deforming properties, which is similar to vulcanized rubber and its heat temperature can reach 135° C. after taking shape. TPV has a hardness range of SHORE 25 A to SHORE 70 D.

TPV may have similar elasticity and/or durability to that of natural rubber and can optionally be combined with PP, PE and EV for moulding and extrusion purposes. As such, TPV may be used to make yarns or filaments for yarns or may be used to form a non-woven material.

Thermoplastic Polyurethane (TPU) is an elastic polymer which may also be utilised in a substrate if desired as this will have properties similar to that of PVC materials without being degraded by UV radiation. TPU will generally have a hardness in the range of SHORE 40 A to SHORE 85 D. Extruded or moulded TPU may be used to form a substrate for use with disclosed embodiments. TPU may have utility as a substrate as it generally exhibits resistance to; grease, aging, weather, water, and temperature resistance in the range of −35° C. to 120° C.

Thermoplastic Polyether Ester Elastomer (TPEE) may be advantageous for used as a substrate or a part thereof as it has advantages of both elastomeric rubber and the strength of engineering plastic. TPEE may include a polyester hard segment and polyether soft segment copolymer to form yarns and/or filaments of the substrate. The hard segment and soft segment together give TPEE a desired hardness and flexibility. Preferably, the hardness range is in the range of SHORE 30D to SHORE 80D. Harder TPEE will have higher heat resistance and the softer cold resistance will be improved.

TPEE may be used as it can provide at least one of; a desired tensile strength in the range of 10 to 300 MPa, desired resilience, oil resistance, wear resistance, heat resistance, impact resistance and desirable mechanical properties.

Processes such as moulding, embossing, stamping, printing, tacking, cutting, melting, ultrasonic welding or any other desired process may be used to modify the shape and/or density of the insulation layer. Embossing an insulation layer or substrate may create ridges or peaks and troughs which can be used to space or bias a radiant barrier from an adjacent surface, such as the skin of a wearer or an insulation layer.

In another embodiment, embossing a substrate will be a two-step process wherein the substrate is provided with a thermal point bond array and a further embossed array or texture can be provided to enhance air gaps. Embossing may allow for gap regions to be formed which can alternatively be filled with insulation and the point bond array provides for larger air gaps between the insulation and the substrate.

In a further embodiment, the embossed layer may also seal in pockets of air or gas. Alternatively, a substrate with portions of closed cell polymers or elastomers may be used which can form air pockets to provide a shape to the substrate. Air gaps may also be filled with down, PrimaLoft™ or microfiber insulation. A metal layer may be disposed on the substrate with the closed cell material. This may be the case for the embodiments of FIGS. 16A and 16B, wherein spacers 300 have been provided which can receive an insulation material. Each of the spacers 300 may be formed by deforming a planar material into a desired shape which can be bonded or fixed to an adjacent substrate, for example on surfaces 320 and 330. The spacers 300, which may be formed by discrete spacer elements 310, may be filled with insulation, and/or insulation may be filled in between spacers. Each of the spacers may be coated with a metal layer 120 which can be a radiant barrier, or the spacers 300 are provided next to a metal layer 120. The spacer 300 may be formed from the same material as that of substrate 110.

Referring to FIGS. 13A to 13F there are illustrated embodiments of embossed substrates. As shown, insulation layer 130 has been embossed with a predetermined shape. The embossing may be imparted by stamping, rolling, moulding, heat forming or any other predetermined method. In another embodiment, the insulation layers 130 have been keyed, perforated or cut to form the desired shape.

Optionally, the insulation layer 130 may be formed from a plurality of layers or laminations which have been bonded, tacked, or fixed together. This may allow for more complex shapes to be formed and portions of the insulating layer 130 to be of different thicknesses, densities, filament size, yarn size, a combination of foam and non-woven, or combinations of the aforementioned. Preferably, if the insulation layer 130 is formed from more than one density, the portion of the layer 130 which is not perforated or embossed is formed with a less dense material such that the integrity or compression resistance of the perforated or embossed portion is greater than that of the portion of the layer 130 which is not embossed or perforated.

The insulation layers of FIGS. 13A to 13F may function as both an insulation layer in addition to being a spacer. Referring to FIG. 13A, there is shown a composite material with a substrate 110 at the distal end, and a further substrate 140 at the proximal end. The distal substrate 110 may be a face fabric or face layer, and the proximal substrate 140 may be an inner fabric or inner layer. Substrate 110 has a metal layer 120, which may be a radiant barrier, disposed on a proximal side of the substrate, and the proximal substrate 140 comprises a metal layer 150 disposed on the distal side of the substrate 140. The insulation 130 is disposed between the two metal layers 120, 150, and are shown as a plurality of discrete elements. The insulation 130 elements may be fixed to the metal layers 120, 150 at their proximal and/or distal sides. Optionally, each second insulation 130 element may be fixed at only one end, and the remaining insulation 130 elements are fixed at the opposing end. Having the elements fixed at only one end may improve flexibility of the textile. The insulation 130 elements may be any predetermined shape, length and height. Further, the spacing between the elements may be at regular intervals or may be spaced in any predetermined array or with any predetermined spacing. Between the elements are preferably air gaps or voids which can be used to allow radiant energy to travel between the radiant barriers. Alternatively, the insulation 130 may be a perforated insulation layer which is not fixed to the adjacent substrates or layers.

FIG. 13E, but further depicts a protective layer 160. The protective layer may be any predetermined functional coating. The insulation layer 130 of FIG. 13E may be perforated or provided with apertures to increase exposure of at least one metal layer 130.

FIGS. 13B and 13F depict another embodiment of the textile 10 in which the insulation layer 130 is embossed or moulded to produce cavities adjacent to the metal layer. It will be appreciated that the insulation layer 130 may be coated with a metal layer 120 and/or 150. FIG. 13F further includes a protective and/or functional coating 160.

Insulation layers may be constructed by a vertical lapping process whereby the height of each lap is arranged to create a textured or stepped surface as shown in FIG. 13F. In another embodiment, a knitted insulation may have a raised surface created by a terry loop and/or brushing, napping or sanding process.

FIG. 13C illustrates an embodiment of a textile with an insulation layer 130 with keyed recesses or cut-away portions on both the distal surface and the proximal surface. There are two metal layers 120, 150, which may be radiant barriers, disposed on or adjacent the proximal and distal sides of the insulation 130 layer.

The thickness and density of the fibres of the at least one insulation layer may be configured to provide a desired infrared transparency, and maintain the desired infrared reflectance of the one or more metal layers.

FIG. 3D shows the use of a fibre insulation 130 adjacent to metal layer 120 whereby the spacing between the fibres of said insulation layer provide exposure of the metal layer through the insulation. The density of the fibres of the insulation layer adjacent to the metal layer may be selected such that the ratio of the volume of fibre in the insulation to the volume of air in the insulation is between 1:30 and 1:1000 and more preferably between 1:100 and 1:1000 to allow for an infrared transparency, and more preferably an infrared transparency of 5% or greater.

FIG. 14A illustrates an insulation layer which has a series of undulations to increase the area of exposed metal layer within the textile 10. The undulations may be disposed in a regular or irregular pattern and can be formed by conventional cutting processes, laser cutting processes, etching processes, moulding processes, or extrusion processes. Alternatively, the undulations are formed from laminations of insulation material and are bonded together. Bonding the layers of insulation may be achieved by stitching or piecing the laminations and securing the laminations with a tether. The laminations may also be bonded by ultrasonic welding or applying adhesive to the laminations. Optionally, the insulation layer 120 may comprise woven or non-woven substrates within laminations or in layer constructions.

FIGS. 14B and 14C illustrate further embodiments of an insulation layer whereby the insulation layer is embossed or moulded to produce cavities or undulations adjacent to the metal layer thereby increasing exposure of said metal layer. While the insulation layer 130 of FIG. 14C is shown as a single insulation layer 130 with an undulating proximal and distal surface, each of the surfaces may be independently embossed or moulded and two layers of insulation may be bonded together or layered to create the insulation layer 130 as shown.

In the embodiment of FIGS. 15A and 15B the insulation material may be bonded to a backing layer such as a thin non-woven layer to provide structural support to allow a larger cavity size. Some sections of the insulation layer may be thicker than other sections to space an adjacent layer from contacting portions of the insulation surface.

The insulation layer 130 of as illustrated in FIGS. 15A, 15B and 15C may optionally be formed by a 3D substrate, which has been moulded or extruded in the desired 3D shape, and creates air gaps adjacent to the metal layers. It will be appreciated that the 3D layer is a layer which is substantially non-planar in at least one region.

In yet another embodiment, the 3D layer may be formed by stitch bonding methods. The 3D layer may be formed as a planar substrate which can be metalised prior to being formed as the 3D layer. A stitch bonding process to gather local material can be used to convert the planar substrate, such as substrate 110 with metal layer 120 (radiant barrier 120), to a 3D layer.

As shown in FIG. 15D, a substrate 110 has been moulded to form an undulating or textured profile. A metal layer 120 is disposed on substrate 110 and aligns to the contours of the substrate 110. Optionally, a metal layer may be disposed on an insulation layer or a membrane layer. The membrane of the embodiments may be a homogenous membrane or composite membrane, which can comprise one or more layers formed from at least one of; PU, PTFE, PP, PE, or any other conventional membrane materials known in the art.

Any embossed substrate may be used as a substrate which a metal layer is disposed on. Alternatively, an embossed substrate (embossed layer) may be applied to a substrate and the metal layer disposed on the embossed layer such that a desired reflectance can be achieved. Further, the embossed substrate may be used to shape the metal layer to partly create a spacer for adjacent portions of the metal layer. An embossed layer may also be used as a spacer or pseudo-insulation layer, and can be embossed with a pattern or design which can allow metal layers disposed thereon to elongate or deform when the embossing is under tension, for example during wear of a garment formed from the textile. Elongation of the embossed layer may mean a relative movement of the metal layer as embossing is flattened or under tension causing undulations of the embossing to move towards an un-embossed configuration.

In one embodiment, the embossed layer may also seal in pockets of air or gas. Alternatively, a substrate with portions of closed cell polymers or elastomers may be used which can form air pockets to provide a shape to the substrate. A metal layer may be disposed on the substrate with the closed cell material.

Application of a radiant barrier or metal layer onto a substrate 110 may cause an increase in friction between adjacent fibres. This increase in friction may reduce fibre movement or yarn mobility of the textile which can cause issues with wearability, stiffness and durability. As such, it may be advantageous to provide for a coating which can increase the movement between adjacent fibres or yarns. For example, a friction reduction coating may be applied which can reduce the friction between adjacent fibres of the substrate. In this way the fibres of the substrate may return to a substantially similar or higher movement state as that prior to radiant barrier or metal layer deposition or application. It will be appreciated that the friction reduction coating may impart any predetermined frictional coefficient to the fibres to either increase or reduce movement between adjacent fibres or yarns of the substrate. Optionally, the friction reduction coating may have an orientation such that only one of the warp and/or weft fibres are imparted with a friction similar to that of the fibres prior to deposition of the radiant barrier or metal layer.

During deposition of the metal layer 120 the substrate is passed over or under a coating barrel which imparts a curvature to the substrate. As deposition is a line-of-sight application, the coating drum curvature may allow for a deposition to be applied to a larger percentage of the yarns in the weft orientation than that of the warp orientation. This is due to the angle of entry and angle of exit from the deposition chamber imparted by the coating drum causing exposure to a larger portion of the circumference of the yarns and thereby allowing coating of more than 180 degrees of the yarns. In some embodiments 180 degrees to 300 degrees of the weft fibres are coated with vapour. In further embodiments up to 340 degrees can be coated with vapour. While yarns are generally constructed of a plurality of filaments, for simplicity the yarns have been shown as having a generally circular cross-section.

When the substrate returns to a more linear configuration after deposition, the deposited material on adjacent yarns may come into contact and thereby increase friction between adjacent yarns. This additional friction may cause the weft yarns to be less mobile than the warp yarns which can reduce tearing strength of the substrate in the weft direction (tearing perpendicular to the weft yarns). While this may in some situations reduce tearing strength, the weft yarns may also provide for a superior radiant barrier relative to the coating on the warp yarns, which may be desirable. This may improve the overall functionality of the substrate as a radiant barrier. However, to improve the tearing strength of the weft yarns, the substrate is preferably coated with a lubricant, or friction reduction coating after or before deposition. The friction reduction coating may optionally also be a functional treatment for the substrate, such as a water-repellent coating or an abrasion resistant coating, for example. Other coatings may also be applied which provide for any predetermined functionalisation on the surface of the substrate.

Applying the friction-reduction coating may improve the mobility of the yarns of the substrate in both the warp and weft directions and may also increase the tearing strength by at least 5% in the warp direction and 5% in the weft direction, relative to the yarns with a deposition without a friction-reduction coating. It will be appreciated that the increase in tearing strength may be increased by 15% in the weft direction and 10% in the warp direction. Preferably, the tearing strength increases restore the warp and weft yarn tearing strength to within 20% of their original tearing strength before deposition. It will be appreciated that the increase in tearing strength may result in tearing strengths greater than the original tearing strength of the substrate prior to deposition. Application of a thicker coating may also increase the tearing strength of the substrate if sufficient yarn mobility is present after coating.

The coating layer illustrated in the Figures has been emphasised for illustrative purposes only to be easier to view, and it will be appreciated that the thickness of the coating layer is preferably in the range of 5 nm to 200 nm. As such, the thickness of the substrate yarns will be at least one order of magnitude greater than that of the coating layer. More preferably, the substrate is between 2 to 3 orders of magnitude thicker than the coating layer, but may also be 4 or 5 orders of magnitude greater than the coating layer.

In another embodiment, the substrate 110 is transported along a concave surface which can further reduce the angle of the coating to less than 180 degrees to substantially maintain a pre-deposition yarn mobility or reduce the radiant barrier coating area deposited onto the yarns of the substrate. Reduction of the coating area can assist with reducing friction between yarns.

Controlling the deposition contact angle on the yarns may also assist with applying multi-layer coatings which can be observed on the surface of the substrate after deposition. For example, if a copper vapour is deposited onto the weft yarns at an angle of between 180 degrees to 340 degrees, the next vapour coating layer may be restricted to 180 degrees or less such that multi-layer coatings may be used to provide a functional and/or visual effect by exposing portions of the underlying coatings. The multi-layer coatings may also assist with adhesion of a protective coating, functional coating or a shell coating which is applied to the multi-layer coatings. For example, a protective or functional coating may have poor adhesion to an aluminium coating, while a copper coating may have good adhesion to the protective or functional coating. Thereby, when a coating is applied, the coating may be securely applied to the copper coating and around the aluminium coating, which may assist with retaining the protective or functional coating on the substrate when the substrate is used for a final application. The materials of aluminium and copper are examples only and any predetermined coating or deposition material may be used to form a multi-layer coating. Optionally, the same material may be used for multi-layer coatings with each layer being applied with a different technique or other predetermined technique.

In another embodiment the coating is applied to a substrate, such as layer 110 or 140, after deposition. Applying a friction reducing coating after deposition allows fibres or yarns to experience movement during use which may improve properties of the substrate. Properties which may be improved may include at least one of; tearing strength, tensile strength, abrasion resistance or any other predetermined property.

The friction reduction coating may be used to fill in micro-pores or pores of the deposition to smooth the surface of the fibres which can improve fibre movement during use. It will be appreciated that the friction reduction coating may bring the frictional coefficient (or frictional factor) down to between 0.01 to 0.5, or more preferably between 0.05 to 0.4 for adjacent fibres of the substrate. Improvement of fibre movement in the substrate, such as layer 110, or layer may increase tearing strength properties of the substrate and improve the utility of the structure for use in garments or other applications which require fibre movement or experience fibre movement for comfort.

Some examples of friction reduction coatings may include Fluorinated (Perfluorinated) Chemicals (PFC's) non-fluorinated (PFC-Free) and durable water repellent coatings (DWR), such as, which may include C0, C6 (short-chain PFC), C8 (long-chain PFC) or non-fluoropolymer based coating. Other coatings may also be applied which may reduce the friction between one or more fibres of the substrate.

In addition, fabric softening agents may also be used as a coating to reduce friction between the fibres of the substrate. Silicones or other polymeric coatings to improve tearing strength may be used, but preferably these are transparent and/or IR transparent coatings which allow for the radiant barrier to function as desired.

Some specific examples of coatings which may be used to improve the frictional properties of the substrate may include at least one of; HeiQ™ HM C6 (C6) and HeiQ™ Barrier ECO DRY™ (PFC Free). It will be appreciated that other coatings may also be used which are common in the art.

It is preferred that non-fluorinated coatings are applied which can reduce the friction between adjacent fibres of the substrate. However, if the coatings are fluorinated, the coatings are preferably either C8 or C6 coatings which can also allow for water repellency.

In another embodiment, the friction reduction coatings may reduce the friction coefficient between adjacent fibres by at least 10% (compared to fibre friction coefficients observed after deposition). More preferably, the friction coefficient between adjacent fibres is reduced by at least 20%, or even more preferably, the friction between adjacent fibres is reduced by at least 30%. The reduction in friction refers to a friction of the fibres of a post-deposition substrate.

The coating may be applied by a padding process, wet dripping process and/or a spray coating process. More than one friction reduction coating may be applied to the substrate after deposition. Improving the fibre movement after deposition may also impart at least one functional property to the substrate.

Optionally, heat treatment of a coating on the substrate may also alter the fibre spacing and/or movement of the fibres of the substrates or layers of the textile composite 100. This again can improve the strength of the substrate, particularly in relation to nylon fibres or nylon composite fibres.

The friction reduction coatings may allow for easier movement of fibres of the substrate, and more easily allow between 0.01 mm to 1 mm of movement of fibres relative to adjacent fibres of the substrate which can improve the durability of the substrate.

It will be appreciated that the substrate may be disposed adjacent to at least one insulation layer. The insulating layer may be any predetermined insulating layer, such as a fibrous insulation layer or a porous insulation layer.

Any other configurations or constructions may also be used which are within the spirit of the invention. The substrate 110 may include woven materials, braided materials and knitted structures. This may also include scrim layers, such as substrate 100 discussed above.

Migration or movement of fibres may only be desirable in the regions of a substrate which is free from fixed, fused, glued or welded fibres. For example, regions of a non-woven substrate where fibres are not fused or fixed may benefit from a lubrication coating or friction reduction coating.

Other textile composite 100 configurations may also be used with substrates of the present disclosure to manufacture textile composites 100. The following constructions may also be used wherein "S" represents a substrate layer, "I" represents an insulation layer, and "M" represents a metal layer. Each of these layers may have a coating applied thereto as discussed above, or may have be formed from more than one layer. For example a metal layer with a coating may be referred to collectively as a "metal layer". Examples of constructions include at least one of the following; S-M-I, S-M-I-M-S, S-I-S-M-I-S, S-M-S-M-I-M-S, S-M-I-S-M-I-M-S, I-M-S, I-M-S-M-I, S-I-M-S-I-S, S-M-I-S-M-I-S, S-M-I-M-S-I-M-S, S-M-I-M, S-M-I-S-I, S-M-I-S-I-M-S, S-M-I-S-I-S, S-M-S-M-I-S, S-I-M-S-I-M-S, S-M-I-M-S-M-I-S, S-M-I-S, I-S-I-M-S,S-I-M-S-M-I, S-I-M-S-M-I-S, S-I-M-S-M-I-M-S, S-I-M-S, I-M-S-M-I-S, S-M-I-M-S-M-I-M-S, M-I-M-S, S-M-I-S-M-I-S, I-M-S-I, S-M-I-M-S-I-S.

While specific reference to substrate 110 has been made throughout this specification with respect to application of coatings and treatments, it will be appreciated that any substrate or layer may have similar coatings and treatments applied thereto if desired. For example, each of these substrates may be metalised, coated, treated, embossed, perforated, cut, undulated or otherwise have similar or the same treatments and coatings applied thereto. It will also be appreciated that each of substrates may be formed from the same materials, or different materials, and/or different construction methods.

In yet another embodiment, metal layers are the only layers provided with lubrication or friction reduction coatings. Other coatings may be applied to other layers which may be similar to that of the friction reduction coatings, but are not used for assisting with fibre movement or fibre migration.

Although the invention has been described with reference to specific examples, it will be appreciated by those skilled in the art that the invention may be embodied in many other forms, in keeping with the broad principles and the spirit of the invention described herein.

The present invention and the described preferred embodiments specifically include at least one feature that is industrial applicable.

What is claimed is:
1. A substrate with an array disposed thereon;
   the substrate comprises a bonding array comprising a plurality of bonding locations with fibers; a low emissivity layer is deposited on at least one side of the substrate; and the fibers include a melted exterior due to bonding of the fibres at the bonding locations melting the exterior of the fibres.

2. The substrate as claimed in claim 1, wherein the plurality of bonding locations are disposed in a regular array.

3. The substrate as claimed in claim 1, wherein the low emissivity layer is a radiant barrier.

4. The substrate as claimed in claim 1, wherein the low emissivity layer comprises a material selected from the following group; aluminium, copper, gold, silver, carbon (such as diamond-like carbons or tetrahedral amorphous carbons), cadmium, zinc, indium, tin, titanium, bismuth, zirconium, zirconia, any combination of materials aforementioned and any of their alloys and/or oxides.

5. The substrate as claimed in claim 1, wherein the bonding locations comprise a primary region of compaction and a secondary region of compaction.

6. The substrate as claimed in claim 1, wherein the shape of the bonding locations of the bonding array comprise at least one shape selected from the group of; diamond, square, triangle, circle and any other predetermined regular shape.

7. The substrate as claimed in claim 1, wherein a friction reduction coating is applied to the substrate, such that the frictional coefficient between adjacent fibres of the substrate is in the range of 0.01 to 0.5.

8. The substrate as claimed in claim 1, wherein an insulation layer is disposed adjacent to the low emissivity layer.

9. The substrate as claimed in claim 8, wherein the density of the fibres of the insulation layer adjacent to the low emissivity layer may be selected such that the ratio of the volume of fibre in the insulation to the volume of air in the insulation is between 1:30 and 1:1000.

10. The substrate as claimed in claim 1, wherein the bonding locations cover more than 40% of the surface of the substrate.

11. The substrate as claimed in claim 1, wherein the substrate is formed with at least one thermoplastic elastomeric selected from the following group; Styrenic block copolymers, TPS (TPE-s), Thermoplastic polyolefinelastomers, TPO (TPE-o), Thermoplastic Vulcanizates, TPV (TPE-v or TPV), Thermoplastic polyurethanes, TPU (TPU) Thermoplastic copolyester, TPC (TPE-E), Thermoplastic polyamides, TPA (TPE-A), Not classified thermoplastic elastomers, TPZ.

12. The substrate as claimed in claim 1, wherein the substrate comprises at least one functionalisation which provides for at least one of the following properties; flame retardancy, UV absorbance, self-cleaning, hydrophobicity, hydrophilicity, and antibacterial properties.

13. The substrate as claimed in claim 1, wherein the bonding array is formed by two or more bonding processes, with each process forming a portion of the bonding array.

14. The substrate as claimed in claim 13, wherein a second bonding process imparts a bonding location which joins to at least one respective bonding location from a first bonding process to form joined bonding locations.

15. A substrate with a bonding array pattern, the substrate comprising:
   a first layer of fabric web;
   a second layer of fabric web bonded to the first layer of fabric web;
   the first and second layers of fabric web being bonded together at a plurality of bonding locations;
   a low emissivity material is disposed on at least one side of the substrate, in which the bonding locations provide a region of compressed fibres which has a larger surface area relative to the unbonded locations of the substrate; and
   wherein the fibers include a melted exterior due to bonding of the fibres at the bonding locations.

16. The substrate as claimed in claim 15, wherein a third layer of fabric web is bonded to the second layer of fabric web.

17. The substrate as claimed in claim 15, wherein the first layer of fabric web and the second layer of fabric web are formed by different processes selected from the following group; a meltblown process, a spunbond process, a spunlace process, dry laid process, and a bonded carded web process.

18. The substrate as claimed in claim 15, wherein each of the bonding locations are formed with a primary region and a secondary region, in which the primary region is formed with a generally uniform thickness and the secondary region is formed with a thickness ranging from the thickness of the substrate to the thickness of the primary region.

19. The substrate as claimed in claim 18, wherein the bonding array pattern is defined by the primary regions of the bonding locations.

20. The substrate as claimed in claim 15, wherein the bonding locations cover more than 20% of the surface of the substrate.

* * * * *